(12) United States Patent
Ji et al.

(10) Patent No.: US 12,273,901 B2
(45) Date of Patent: Apr. 8, 2025

(54) COMMUNICATION METHOD AND COMMUNICATIONS APPARATUS

(71) Applicant: HUAWEI TECHNOLOGIES CO., LTD., Guangdong (CN)

(72) Inventors: Liuliu Ji, Shanghai (CN); Fei Gao, Shanghai (CN); Haicun Hang, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 17/672,526

(22) Filed: Feb. 15, 2022

(65) Prior Publication Data

US 2022/0174660 A1    Jun. 2, 2022

Related U.S. Application Data

(63) Continuation of application No. PCT/CN2020/109399, filed on Aug. 14, 2020.

(30) Foreign Application Priority Data

Aug. 16, 2019   (CN) .......................... 201910760959.8
Sep. 30, 2019   (CN) .......................... 201910943941.1

(51) Int. Cl.
*H04W 72/51*   (2023.01)
*H04L 1/00*    (2006.01)
(Continued)

(52) U.S. Cl.
CPC .......... *H04W 72/51* (2023.01); *H04L 1/0038* (2013.01); *H04W 72/0446* (2013.01); *H04W 72/23* (2023.01)

(58) Field of Classification Search
CPC ... H04L 1/0038; H04L 1/0046; H04L 5/0035; H04L 5/0053; H04L 5/0094;
(Continued)

(56) References Cited

U.S. PATENT DOCUMENTS 10,165,582 B2 * 12/2018 Papasakellariou .... H04W 88/08
11,012,994 B2 *  5/2021 Khoshnevisan ...... H04W 72/23
(Continued)

FOREIGN PATENT DOCUMENTS

AU    2019351191 A1 *  5/2021  ........... H04L 5/0005
AU    2019460763 A1 *  1/2022  ............ H04L 5/001
(Continued)

OTHER PUBLICATIONS

Bgpp TS 38.213 V15.5.0, (Mar. 2019), "3rd Generation Partnership Project; Technical Specification Group Radio Access Network; NR; Physical Layer Procedures for Control (Release 15)," Mar. 2019, 104 pages.
(Continued)

*Primary Examiner* — Eric Nowlin
(74) *Attorney, Agent, or Firm* — Fish & Richardson P.C.

(57) ABSTRACT

This disclosure provides communications methods and apparatuses. In an implementation, a terminal device performs operations comprising: receiving first configuration information from a network device, wherein the first configuration information indicates a configured quantity of physical downlink control channel (PDCCH) candidate locations in a time unit corresponding to a first control resource set (CORESET) group of a plurality of CORESET groups in a target cell, and determining, based on the configured quantity and a first quantity, a quantity of PDCCH candidate locations for PDCCH detection in the time unit corresponding to the first CORESET group, wherein the first quantity is a preset quantity of PDCCH
(Continued)

candidate locations in a time unit corresponding to a CORE-SET group in the target cell.

40 Claims, 6 Drawing Sheets

(51) Int. Cl.
*H04W 72/0446* (2023.01)
*H04W 72/23* (2023.01)

(58) Field of Classification Search
CPC . H04W 72/0446; H04W 72/20; H04W 72/23; H04W 72/51
See application file for complete search history.

(56) References Cited

U.S. PATENT DOCUMENTS

| | | | | |
|---|---|---|---|---|
| 11,044,619 | B2* | 6/2021 | Seo | H04W 72/23 |
| 11,082,154 | B2* | 8/2021 | Seo | H04L 1/0038 |
| 11,109,432 | B2* | 8/2021 | Nammi | H04L 5/0069 |
| 11,206,659 | B2* | 12/2021 | Khoshnevisan | H04W 72/23 |
| 11,233,688 | B2* | 1/2022 | Yang | H04L 5/0051 |
| 11,309,989 | B2* | 4/2022 | Ouchi | H04W 72/0453 |
| 11,516,787 | B2* | 11/2022 | Takeda | H04W 72/04 |
| 11,516,788 | B2* | 11/2022 | Takeda | H04W 72/23 |
| 11,576,062 | B2* | 2/2023 | Khoshnevisan | H04W 8/24 |
| 11,641,669 | B2* | 5/2023 | Nakashima | H04L 5/0053 370/329 |
| 11,653,354 | B2* | 5/2023 | Cirik | H04B 7/088 370/329 |
| 11,683,798 | B2* | 6/2023 | Lee | H04L 5/0023 370/329 |
| 11,909,526 | B2* | 2/2024 | Yuan | H04B 7/022 |
| 11,917,630 | B2* | 2/2024 | Cirik | H04B 7/0695 |
| 11,956,074 | B2* | 4/2024 | Xu | H04W 72/21 |
| 11,956,802 | B2* | 4/2024 | Seok | H04L 1/08 |
| 12,010,682 | B2* | 6/2024 | Cheng | H04W 72/20 |
| 12,021,580 | B2* | 6/2024 | Zhang | H04L 5/001 |
| 2011/0143796 | A1* | 6/2011 | Lee | H04L 1/0038 455/507 |
| 2019/0081667 | A1 | 3/2019 | Yang et al. | |
| 2019/0253904 | A1 | 8/2019 | Tsai et al. | |
| 2019/0268206 | A1* | 8/2019 | Yang | H04L 5/0051 |
| 2020/0045569 | A1* | 2/2020 | Seo | H04W 72/23 |
| 2020/0163062 | A1* | 5/2020 | Takeda | H04W 8/24 |
| 2020/0267788 | A1* | 8/2020 | Nammi | H04L 5/0053 |
| 2021/0028883 | A1* | 1/2021 | Wang | H04W 72/0446 |
| 2021/0045042 | A1* | 2/2021 | Nakashima | H04L 5/0094 |
| 2021/0045141 | A1* | 2/2021 | Lee | H04L 5/0053 |
| 2021/0050936 | A1* | 2/2021 | Seo | H04W 72/20 |
| 2021/0084637 | A1* | 3/2021 | Cheng | H04W 72/51 |
| 2021/0092772 | A1* | 3/2021 | Nakashima | H04L 5/0053 |
| 2021/0099979 | A1* | 4/2021 | Takeda | H04W 72/23 |
| 2021/0105750 | A1* | 4/2021 | Khoshnevisan | H04W 72/23 |
| 2021/0105765 | A1* | 4/2021 | Cirik | H04W 76/18 |
| 2021/0127285 | A1* | 4/2021 | Khoshnevisan | H04L 5/001 |
| 2021/0136770 | A1* | 5/2021 | Nakashima | H04W 72/53 |
| 2021/0211226 | A1* | 7/2021 | Xu | H04W 72/0453 |
| 2021/0219301 | A1* | 7/2021 | Shen | H04L 5/0005 |
| 2021/0227521 | A1* | 7/2021 | Khoshnevisan | H04L 5/001 |
| 2021/0297114 | A1* | 9/2021 | Zhang | H04B 7/0671 |
| 2021/0314997 | A1* | 10/2021 | Seo | H04L 5/0094 |
| 2021/0351865 | A1* | 11/2021 | Ouchi | H04W 8/24 |
| 2021/0352501 | A1* | 11/2021 | Taherzadeh Boroujeni | H04W 72/0446 |
| 2022/0116177 | A1* | 4/2022 | Shi | H04L 5/0055 |
| 2022/0167326 | A1* | 5/2022 | Khoshnevisan | H04L 5/001 |
| 2022/0256603 | A1* | 8/2022 | Harada | H04W 72/0453 |
| 2022/0329385 | A1* | 10/2022 | Liu | H04L 5/0094 |
| 2022/0330163 | A1* | 10/2022 | Liu | H04W 52/146 |
| 2022/0345245 | A1* | 10/2022 | Yuan | H04L 5/0023 |
| 2023/0156743 | A1* | 5/2023 | Seok | H04L 1/0072 370/329 |
| 2023/0246673 | A1* | 8/2023 | Zhang | H04B 7/024 370/329 |
| 2023/0337242 | A1* | 10/2023 | Cirik | H04W 52/146 |
| 2024/0163878 | A1* | 5/2024 | Cirik | H04B 7/0639 |

FOREIGN PATENT DOCUMENTS

| | | | | |
|---|---|---|---|---|
| CA | 3114819 | A1 * | 4/2020 | H04L 5/0005 |
| CN | 104244417 | A | 12/2014 | |
| CN | 109121159 | A | 1/2019 | |
| CN | 109309547 | A | 2/2019 | |
| CN | 109474384 | A | 3/2019 | |
| CN | 109495234 | A | 3/2019 | |
| CN | 109644082 | A | 4/2019 | |
| CN | 109756983 | A | 5/2019 | |
| CN | 110972320 | A * | 4/2020 | H04L 5/0005 |
| CN | 113711665 | A * | 11/2021 | H04L 5/001 |
| CN | 110972320 | B * | 1/2022 | H04L 5/0005 |
| CN | 114430315 | A * | 5/2022 | H04L 5/001 |
| CN | 114503475 | A * | 5/2022 | H04L 1/1614 |
| CN | 115104352 | A * | 9/2022 | H04L 1/0038 |
| CN | 114430315 | B * | 7/2023 | H04L 5/001 |
| EP | 3860258 | A1 * | 8/2021 | H04L 5/0005 |
| EP | 3965495 | A1 * | 3/2022 | H04L 5/001 |
| EP | 3965495 | B1 * | 12/2023 | H04L 5/001 |
| EP | 4293948 | A2 * | 12/2023 | H04L 5/001 |
| EP | 4085705 | B1 * | 5/2024 | H04L 1/0038 |
| EP | 4293948 | B1 * | 10/2024 | H04L 5/001 |
| JP | 2022548192 | A * | 11/2022 | |
| KR | 20220046518 | A * | 4/2022 | |
| KR | 20220073747 | A * | 6/2022 | |
| WO | WO-2020063271 | A1 * | 4/2020 | H04L 5/0005 |
| WO | WO-2021022498 | A1 * | 2/2021 | H04L 5/001 |
| WO | WO-2021067190 | A1 * | 4/2021 | H04L 1/1614 |
| WO | WO-2021138627 | A1 * | 7/2021 | H04L 1/0038 |

OTHER PUBLICATIONS

Extended European Search Report issued in European Application No. 20853804.1 on Oct. 5, 2022, 13 pages.
Huawei et al., "Enhancements on Multi-TRP/Panel Transmission," 3GPP TSG RAN WG1 Meeting #96bis, R1-1903970, Xi'an, China, Apr. 8-12, 2019, 20 pages.
Huawei et al., "Summary of AI: 7.2.8.2 Enhancements on Multi-TRP/ Panel Transmission of Offline Discussion," 3GPP TSG RAN WG1 Meeting #97, R1-1907706, Reno, USA, May 13-17, 2019, 66 pages.
3GPP TS 38.211 V15.6.0 (Jun. 2019), "3rd Generation Partnership Project; Technical Specification Group Radio Access Network;NR;Physical channels and modulation(Release 15)," Jun. 2019, 97 pages.
3GPP TS 38.212 V15.6.0 (Jun. 2019), "3rd Generation Partnership Project; Technical Specification Group Radio Access Network;NR;Multiplexing and channel coding(Release 15)," Jun. 2019, 101 pages.
3GPP TS 38.213 V15.6.0 (Jun. 2019), "3rd Generation Partnership Project; Technical Specification Group Radio Access Network;NR;Physical layer procedures for control(Release 15)," Jun. 2019, 107 pages.
3GPP TS 38.214 V15.6.0 (Jun. 2019), "3rd Generation Partnership Project; Technical Specification Group Radio Access Network;NR;Physical layer procedures for data(Release 15)," Jun. 2019, 105 pages.
CATT, "PDCCH search space design," 3GPP TSG RAN WG1 Meeting AH_#NR3, R1-1715813, Nagoya, Japan, Sep. 18-21, 2017, 10 pages.
Ericsson, "On Group-Common PDCCH Structure and Configuration," 3GPP TSG RAN WG1 NR Ad-Hoc#2, R1-1711483, Qingdao, P.R. China, Jun. 27-30, 2017, 4 pages.
Huawei, HiSilicon, "Enhancements on Multi-TRP/panel transmission," 3GPP TSG RAN WG1 #97, R1-1906029, Reno, USA, May 13-17, 2019, 18 pages.
Huawei, HiSilicon, "Summary of AI: 7.2.8.2 Enhancements on Multi-TRP/Panel Transmission of Offline Discussion," 3GPP TSG RAN WG1 Meeting #97, R1-1907706, Reno, USA, May 13-17, 2019, 66 pages.

(56) References Cited

OTHER PUBLICATIONS

Office Action issued in Chinese Application No. 201910943941.1 on Jan. 17, 2022, 6 pages (with English translation).
Office Action issued in Chinese Application No. 201910943941.1 on Jul. 19, 2021, 23 pages (with English translation).
OPPO, "Enhancements on multi-TRP and multi-panel transmission," 3GPP TSG RAN WG1 Meeting #96bis, R1-1904036, Xi'an, China, Apr. 8-12, 2019, 10 pages.
PCT International Search Report and Written Opinion issued in International Application No. PCT/CN2020/109399 on Nov. 18, 2020, 15 pages (with English translation).

\* cited by examiner

COMMUNICATION METHOD AND COMMUNICATIONS APPARATUS

CROSS-REFERENCE TO RELATED APPLICATIONS

This application is a continuation of International Application No. PCT/CN2020/109399, filed on Aug. 14, 2020, which claims priority to Chinese Patent Application No. 201910760959.8, filed on Aug. 16, 2019 and Chinese Patent Application No. 201910943941.1, filed on Sep. 30, 2019. The disclosures of the aforementioned applications are hereby incorporated by reference in their entireties.

TECHNICAL FIELD

This application relates to the field of mobile communications technologies, and in particular, to a communication method and a communications apparatus.

BACKGROUND

Currently, when user equipment (user equipment, UE) receives a physical downlink control channel (physical downlink control channel, PDCCH), a commonly used method is blind detection. That is, there may be a plurality of candidate locations (candidate) for the PDCCH. The plurality of candidate locations may refer to a plurality of dimensions such as a time domain resource, a frequency domain resource, or a code domain resource. The UE may successfully detect, by performing blind detection at a preconfigured or predefined candidate location, downlink control information (download control information, DCI) carried on the PDCCH.

A single-cell blind detection capability $M_{PDCCH}^{max,slot,\mu}$ of the UE is defined in new radio (new radio, NR). When the UE receives a PDCCH transmitted by using a cell, a quantity of candidate locations of the PDCCH in the cell in each slot does not exceed $M_{PDCCH}^{max,slot,\mu}$. Therefore, a quantity of times the UE blindly detects the PDCCH in the cell in each slot does not exceed $M_{PDCCH}^{max,slot,\mu}$. A value of $M_{PDCCH}^{max,slot,\mu}$ is related to a parameter set (numerology) of the cell.

However, currently, a PDCCH blind detection capability of the UE in a scenario of scheduling a terminal by a plurality of transmission/reception points (multiple transmission reception point, M-TRP) is not defined. If the terminal still performs blind detection based on a single-cell blind detection capability, when the plurality of TRPs schedule the terminal in one serving cell, there is a limited quantity of times that can be allocated to each TRP for blind detection. Consequently, flexibility of scheduling the terminal by a network device is affected.

SUMMARY

This application provides a communication method and a communications apparatus, to optimize a PDCCH blind detection manner of a terminal when the terminal is scheduled by a plurality of transmission/reception points in one serving cell.

According to a first aspect, this application provides a communication method. The method may be performed by a terminal such as a mobile phone or a chip in a terminal.

The method includes: The terminal may receive first configuration information from a network device, where the first configuration information is used to indicate a configured quantity of PDCCH candidate locations in a time unit corresponding to a first control resource set (control resource set, CORESET) group; and when the configured quantity is greater than a first quantity, the terminal may detect a PDCCH at PDCCH candidate locations whose quantity is less than or equal to the first quantity; or when the configured quantity is less than or equal to a first quantity, the terminal may detect a PDCCH at PDCCH candidate locations whose quantity is less than or equal to the configured quantity, where the first quantity is a preset maximum quantity of PDCCH candidate locations in a time unit corresponding to a CORESET group in a target cell, and the first CORESET group is one of a plurality of CORESET groups in the target cell.

According to the method, the terminal may perform, based on the first configuration information for a maximum of the first quantity of times, blind detection at the PDCCH candidate locations configured by the network device for the first CORESET group. In comparison with a solution, in the conventional technology, in which the terminal blindly detects the PDCCH for all CORESETs in the target cell for a maximum of the first quantity of times, blind detection is performed for a CORESET corresponding to each TRP for a larger quantity of times. Therefore, scheduling flexibility can be improved.

In a possible design, the terminal may receive first information from the network device, and the first information is used to indicate the first CORESET group.

In a possible design, the first information includes a higher layer index whose value is 0. Alternatively, a value of the first information is 0.

In a possible design, if the target cell is one of a plurality of cells in which the terminal works, the terminal may determine a third quantity based on a PDCCH blind detection capability of the terminal and a second quantity. The second quantity is a specified maximum quantity of PDCCH candidate locations in a time unit corresponding to a CORESET group in a first cell. The third quantity is a specified maximum quantity of PDCCH candidate locations in a time unit corresponding to the first cell. The first cell includes one or more cells that are in the plurality of cells and whose parameter sets have a same value. A quantity of times the terminal blindly detects the PDCCH in a time unit corresponding to each CORESET group in the first cell does not exceed the second quantity and the third quantity.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left( N_{cells}^{DL,\mu,multi-trp} * n1 + N_{cells}^{DL,\mu,single-trp} \right) \middle/ \sum_{j=0}^{3} \left( N_{cells}^{DL,j,multi-trp} * n1 + N_{cells}^{DL,j,single-trp} \right) \right\rfloor,$$

where $M_{PDCCH}^{max,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ presents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is determined based on a capability of the terminal.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \middle/ \right.$$
$$\left. \sum_{j=0}^{3} \left(N_{cells}^{DL,j,multi-trp} * n1 + N_{cells}^{DL,j,single-trp}\right) \right\rfloor,$$

where $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_{c}^{DL,\mu,multi-trp}$ represents a quantity of cells, in the first cell, for which a plurality of CORESET groups are configured, a quantity of a plurality of CORESET groups is n1, $N_{c}^{DL,\mu,single-trp}$ presents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ represents a quantity of cells, in all the cells, for which one CORESET group is configured, and a sum of $N_{cells}^{DL,j,multi-trp}$ and $N_{cells}^{DL,j,single-trp}$ is a total quantity of all cells.

In a possible design, a quantity of times the terminal blindly detects the PDCCH in the time unit corresponding to the first cell does not exceed a product of the second quantity and a quantity of CORESET groups in the first cell.

In a possible design, if the target cell is one of the plurality of cells in which the terminal works, the terminal may determine a fifth quantity based on the PDCCH blind detection capability of the terminal and a fourth quantity. The fourth quantity is a specified maximum quantity of non-overlapping control channel elements (control channel element, CCE) in a time unit corresponding to a CORESET group in a second cell. The fifth quantity is a maximum quantity of non-overlapping CCEs in a time unit corresponding to the second cell. The second cell includes one or more cells that are in the plurality of cells and whose parameter sets have a same value. A quantity of non-overlapping CCEs detected by the terminal in a time unit corresponding to each CORESET group in the second cell does not exceed the fourth quantity and the fifth quantity.

In a possible design, the fifth quantity meets the following formula:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \right.$$
$$\left. \sum_{j=0}^{3} \left(N_{cells}^{DL,j,multi-trp} * n1 + N_{cells}^{DL,j,single-trp}\right) \right\rfloor,$$

where $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{c}^{DL,\mu,multi-trp}$ represents a quantity of cells, in the second cell, for which a plurality of CORESET groups are configured, $N_{c}^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ is the total quantity of all cells, and the value of n1 is determined cells based on the capability of the terminal.

In a possible design, the fifth quantity meets the following formula:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \right.$$
$$\left. \sum_{j=0}^{3} \left(N_{cells}^{DL,j,multi-trp} * n1 + N_{cells}^{DL,j,single-trp}\right) \right\rfloor,$$

where $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{c}^{DL,\mu,multi-trp}$ represents a quantity of cells, in the second cell, for which a plurality of CORESET groups are configured, a quantity of a plurality of CORESET groups is n1, $N_{c}^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, and the sum of $N_{cells}^{DL,j,multi-trp}$ and $N_{cells}^{DL,j,single-trp}$ is the total quantity of all cells.

In a possible design, a quantity of non-overlapping CCEs detected by the terminal in the time unit corresponding to the second cell does not exceed a product of the fourth quantity and a quantity of CORESET groups in the second cell.

In a possible design, that a value of n1 is determined based on a capability of the terminal includes: The value of n1 is less than or equal to second information, the second information is used to indicate a value of the PDCCH blind detection capability, and the second information is 1 or 2.

In a possible design, the second information is information reported by the terminal for each frequency band or frequency band combination.

In a possible design, the value of the PDCCH blind detection capability of the terminal may be a quantity of transmission/reception points corresponding to the plurality of cells. Alternatively, the value of the PDCCH blind detection capability of the terminal is m, and 1≤m<16. In other words, m is less than 16, and is greater than or equal to 1.

In a possible design, the terminal may send a multi-TRP coordination capability of the terminal to the network device, where the multi-TRP coordination capability is used to determine the PDCCH blind detection capability of the terminal; and the terminal may receive a first indication from the network device, where the first indication is used to indicate the PDCCH blind detection capability, and the PDCCH blind detection capability is one of the one or more multi-TRP coordination capabilities; or each multi-TRP coordination capability is one of one or more parameter candidate values, and the value of the PDCCH blind detection capability is a parameter candidate value that does not exceed a maximum value of the one or more multi-TRP coordination capabilities.

In a possible design, the multi-TRP coordination capability of the terminal may be represented by using a symbol N2. The terminal may report the one or more multi-TRP coordination capabilities (or referred to as multi-TRP coordination capability parameters) N2 supported by the terminal to the network device, where N2 is greater than or equal to 1. The maximum value of N2 is a quantity (which is a constant) of transmission/reception points for coordinated transmission, for example, 2 (which may be another value). Optionally, N2 may be set as follows: 1≤N2≤2. In other words, N2 is less than or equal to 2, and is greater than or equal to 1. N2 may be a non-integer.

A value of each multi-TRP coordination capability N2 may be one of N2 candidate values. There may be one or more N2 candidate values. A same N2 candidate value is configured for the terminal and the network device. The plurality of N2 candidate values may be discrete values.

When the terminal reports the one or more multi-TRP coordination capabilities N2, $N_{cells}^{cap}$ that may be configured by the network device may be one of the one or more multi-TRP coordination capabilities N2 reported by the terminal. Alternatively, compatibility with a smaller value may be implemented for N2 reported by the terminal. For example, the N2 candidate values are 1, 1.5, 2, 2.5, . . . , and if the value of N2 reported by the terminal is 2, the network device may select a value of $N_{cells}^{cap}$ from N2 candidate values 1, 1.5, and 2 that are less than or equal to (or less than) 2 and that are in the N2 candidate values. Herein, $N_{cells}^{cap}$ represents the PDCCH blind detection capability of the terminal.

In this design, the value of $N_{cells}^{cap}$ may be more flexibly determined.

In a possible design, the terminal may send the second information to the network device, and the second information is used to indicate the value of the PDCCH blind detection capability.

In a possible design, when a quantity of a plurality of cells is greater than a value of the PDCCH blind detection capability, the terminal may determine the third quantity based on a value of a parameter set of the first cell, the second quantity, the quantity of CORESET groups in the first cell, and a quantity of CORESET groups in the plurality of cells.

Specifically, the terminal may determine the third quantity based on the following formula:

$$M_{PDCCH}^{total,slot,\mu} = \left\lfloor N_{cells}^{cap} \cdot M_{PDCCH}^{max,slot,\mu} \cdot \left( \sum_{c=0}^{cells} N_c^{DL,\mu,trp} \right) \Big/ \left( \sum_{j=0}^{3} \sum_{c=0}^{cells} N_c^{DL,j,trp} \right) \right\rfloor,$$

where
$M_{PDCCH}^{total,slot,\mu}$ represents the third quantity, $N_{cells}^{cap}$ represents the PDCCH blind detection capability of the terminal, $M_{PDCCH}^{max,slot,\mu}$ represents the second quantity, $N_c^{DL,\mu,trp}$ represents the quantity of CORESET groups in the first cell, $$\sum_{j=0}^{3} \sum_{c=0}^{cells} N_c^{DL,j,trp}$$

represents the quantity of CORESET groups in the plurality of cells, and μ represents a parameter set of each cell in the first cell. A value of $M_{PDCCH}^{max,slot,\mu}$ may be determined based on Table 1.

In a possible design, when a quantity of a plurality of cells is greater than a value of the PDCCH blind detection capability, the terminal may determine the fifth quantity based on a value of a parameter set of the second cell, the fourth quantity, the quantity of CORESET groups in the second cell, and a quantity of CORESET groups in the plurality of cells.

$$C_{PDCCH}^{total,slot,\mu} = \left\lfloor N_{cells}^{cap} \cdot C_{PDCCH}^{max,slot,\mu} \cdot \left( \sum_{c=0}^{cells} N_c^{DL,\mu,trp} \right) \Big/ \left( \sum_{j=0}^{3} \sum_{c=0}^{cells} N_c^{DL,j,trp} \right) \right\rfloor,$$

where
$C_{PDCCH}^{total,slot,\mu}$ represents the fifth quantity, $N_{cells}^{cap}$ represents the PDCCH blind detection capability of the terminal, $C_{PDCCH}^{max,slot,\mu}$ represents a maximum quantity of non-overlapping CCEs in a cell whose numerology has a value of μ in a single-cell transmission mode, $N_c^{DL,\mu,trp}$ is a quantity of TRPs in the cell c whose numerology is μ, $$\sum_{j=0}^{3} \sum_{c=0}^{cells} N_c^{DL,j,trp}$$

represents a total quantity of TRPs in all the cells, and μ represents a parameter set of each cell in the second cell. A value of $C_{PDCCH}^{max,slot,\mu}$ may be determined by querying Table 2 based on a value of μ.

In a possible design, when a quantity of a plurality of cells is less than or equal to a value of the PDCCH blind detection capability, the third quantity may be equal to the second quantity, and/or the fifth quantity may be equal to the fourth quantity.

In another communication method provided in an embodiment of this application, a terminal may receive configuration information of a plurality of CORESETs from a network device, where configuration information of each CORESET is used to indicate a downlink control channel PDCCH candidate location corresponding to the CORESET, and each CORESET corresponds to one TRP; the terminal may determine one or more monitoring occasions (span) based on the configuration information of the plurality of CORESETs, where each span is used to indicate duration of monitoring a PDCCH by the terminal; and the terminal may receive, based on the one or more spans, control information sent by the network device through the PDCCH. In this way, the terminal may determine one or more spans based on the configuration information of each CORESET, and blindly detect the PDCCH in each span, to avoid disorder during blind detection.

In a possible design, the terminal may determine the span corresponding to each CORESET based on information about each CORESET.

In a possible design, a length of the span corresponding to each CORESET is determined based on a maximum length of each CORESET.

In a possible design, the terminal may determine that a time domain spacing between any two of the plurality of spans is not less than a minimum time domain spacing between spans supported by the terminal.

In a possible design, the terminal may send a span spacing capability to the network device, and the span spacing capability is used to indicate the minimum time domain spacing.

In this design, the terminal blindly detects the PDCCH in the span corresponding to each CORESET, and the terminal detects no more than one PDCCH in each span. In this example, UE may report the minimum time domain spacing between the spans, to less frequently detect DCI.

In a possible design, if the terminal determines one span based on information about the plurality of CORESETs, a length of the span may be a sum of maximum lengths of the CORESETs.

In a possible design, if the terminal determines one span based on information about the plurality of CORESETs, the terminal may determine, based on a quantity of a plurality of CORESETs, a maximum quantity of PDCCHs detected in the span. The maximum quantity is less than or equal to a value of a PDCCH scheduling capability of the terminal, and the PDCCH scheduling capability of the terminal is used to indicate a maximum quantity of PDCCHs detected by the terminal in a span.

In a possible design, the terminal may send the PDCCH scheduling capability of the terminal to the network device.

In this design, the terminal may receive the PDCCH in the span corresponding to the plurality of CORESETs, and the terminal may detect a plurality of PDCCHs in each span. A quantity of PDCCHs detected by the terminal in each span does not exceed a maximum quantity that is of PDCCHs received in a span and that is supported by the terminal. When the plurality of spans overlap, the terminal may not perform blind detection in an overlapping span.

According to a second aspect, this application provides a communication method. The method may be performed by a network device or a chip in a network device. The network device may include an access network device such as a base station.

According to the method, the network device may determine first configuration information, where the first configuration information is used to indicate a configured quantity of PDCCH candidate locations in a time unit corresponding to a first CORESET group, and the first CORESET group is one of a plurality of CORESET groups in a target cell; and the network device sends the first configuration information to a terminal.

In a possible design, the configured quantity may be greater than, equal to, or less than a first quantity, and the first quantity is a preset maximum quantity of PDCCH candidate locations in a time unit corresponding to a CORESET group in the target cell.

In a possible design, the network device may send first information to the terminal, and the first information is used to indicate the first CORESET group.

In a possible design, the first information includes a higher layer index whose value is 0. Alternatively, a value of the first information is 0.

In a possible design, if the target cell is one of a plurality of cells in which the terminal works, the network device may determine a third quantity based on a PDCCH blind detection capability of the terminal and a second quantity, where the second quantity is a specified maximum quantity of PDCCH candidate locations in a time unit corresponding to a CORESET group in a first cell, the third quantity is a specified maximum quantity of PDCCH candidate locations in a time unit corresponding to the first cell, and the first cell includes one or more cells that are in the plurality of cells and whose parameter sets have a same value; and the network device may determine second configuration information based on the third quantity, where the second configuration information is used to configure a PDCCH candidate location for the terminal in the time unit corresponding to the first cell.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \right/$$
$$\sum_{j=0}^{3} \left(N_{cells}^{DL,j,multi-trp} * n1 + N_{cells}^{DL,j,single-trp}\right) \right\rfloor,$$

where $M_{PDCCH}^{max,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{SL,j,multi-trp}$ represents a quantity of cells, in all cells configured by the network device, for which a plurality of CORESET groups are configured, $N_{cell}^{SL,j,single-trp}$ represents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is determined based on a capability of the terminal.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,mulit-trp} * n1 + N_{cells}^{DL,\mu,single-trp}\right) \right/$$
$$\sum_{j=0}^{3} \left(N_{cells}^{DL,j,multi-trp} * n1 + N_{cells}^{DL,j,single-trp}\right) \right\rfloor,$$

where $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, a quantity of a plurality of CORESET groups is n1, $N_c^{DL,\mu,singletrp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ represents a quantity of cells, in all the cells, for which one CORESET group is configured, and a sum of $N_{cells}^{DL,j,multi-trp}$ and $N_{cells}^{DL,j,single-trp}$ is a total quantity of all cells.

In a possible design, a quantity of PDCCH candidate locations configured by the network device in a time unit corresponding to each CORESET group in the first cell does not exceed the second quantity and the third quantity.

In a possible design, a quantity of PDCCH candidate locations configured by the network device in the time unit corresponding to the first cell does not exceed a product of the second quantity and a quantity of CORESET groups in the first cell.

In a possible design, if the target cell is one of the plurality of cells in which the terminal works, the network device may determine a fifth quantity based on the PDCCH blind detection capability of the terminal and a fourth quantity, where the fourth quantity is a specified maximum quantity of non-overlapping CCEs in a time unit corresponding to a CORESET group in a second cell, the fifth quantity is a maximum quantity of non-overlapping CCEs in a time unit corresponding to the second cell, and the second cell includes one or more cells that are in the plurality of cells and whose parameter sets have a same value; and the network device may determine third configuration information based on the fifth quantity, where the third configuration information is used to configure a maximum quantity of non-overlapping CCEs for the terminal in the time unit corresponding to the second cell.

For example, a maximum quantity of non-overlapping CCEs configured by the network device in a time unit corresponding to each CORESET group in the second cell does not exceed the fourth quantity and the fifth quantity.

In a possible design, the fifth quantity meets the following formula:

$$C_{PDCCH}^{total,slot,\mu} = \left[ N_{cells}^{cap} \cdot C_{PDCCH}^{max,slot,\mu} \cdot \left( N_{cells}^{DL,\mu,mulit-trp} * n1 + N_{cells}^{DL,\mu,single-trp} \right) \middle/ \sum_{j=0}^{3} \left( N_{cells}^{DL,j,multi-trp} * n1 + N_{cells}^{DL,j,single-trp} \right) \right],$$

where
$C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_c^{DL,\mu,multi-trp}$ represents a quantity of cells, in the second cell, for which a plurality of CORESET groups are configured, $N_c^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ is the total quantity of all cells, and the value of n1 is determined based on the capability of the terminal.

In a possible design, the fifth quantity meets the following formula:

$$C_{PDCCH}^{total,slot,\mu} = \left[ N_{cells}^{cap} \cdot C_{PDCCH}^{max,slot,\mu} \cdot \left( N_{cells}^{DL,\mu,mulit-trp} * n1 + N_{cells}^{DL,\mu,single-trp} \right) \middle/ \sum_{j=0}^{3} \left( N_{cells}^{DL,j,multi-trp} * n1 + N_{cells}^{DL,j,single-trp} \right) \right],$$

where
$C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{cells}^{DL,\mu,multi-trp}$ represents a quantity of cells, in the second cell, for which a plurality of CORESET groups are configured, a quantity of a plurality of CORESET groups is n1, $N_{cells}^{DL,\mu,single-trp}$ represents the quantity of cells, in the first cell, for which one CORESET group is configured, $N_{cells}^{DL,j,multi-trp}$ and $N_{cells}^{DL,j,single-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, and the sum of $N_{cells}^{DL,j,multi-trp}$ and $N_{cells}^{DL,j,single-trp}$ cells is the total quantity of all cells.

In a possible design, a maximum quantity of non-overlapping CCEs configured by the network device in the time unit corresponding to the second cell does not exceed a product of the fourth quantity and a quantity of CORESET groups in the second cell.

In a possible design, that a value of n1 is determined based on a capability of the terminal includes: The value of n1 is less than or equal to second information, the second information is used to indicate a value of the PDCCH blind detection capability, and the second information is 1 or 2.

In a possible design, the second information is information reported by the terminal for each frequency band or frequency band combination.

In a possible design, the value of the PDCCH blind detection capability of the terminal is a quantity of transmission/reception points corresponding to the plurality cells; or the value of the PDCCH blind detection capability of the terminal is m, and 1≤m≤16, in other words, m is less than 16, and is greater than or equal to 1.

In a possible design, the network device may receive one or more multi-TRP coordination capabilities of the terminal from the terminal; the network device may determine the PDCCH blind detection capability of the terminal based on the one or more multi-TRP coordination capabilities, where the PDCCH blind detection capability is one of the one or more multi-TRP coordination capabilities, or each multi-TRP coordination capability is one of one or more parameter candidate values, and the value of the PDCCH blind detection capability is a parameter candidate value that does not exceed a maximum value of the one or more multi-TRP coordination capabilities; and the network device may send a first indication to the terminal, where the first indication is used to indicate the PDCCH blind detection capability.

In a possible design, the network device may receive the second information from the terminal, and the second information is used to indicate the value of the PDCCH blind detection capability of the terminal.

In another communication method provided in an embodiment of this application, a network device may generate configuration information of a plurality of CORESETs, where configuration information of each CORESET is used to indicate a downlink control channel PDCCH candidate location corresponding to the CORESET, and each CORESET corresponds to one TRP; and the network device may send the configuration information of the plurality of CORESETs to a terminal.

In a possible design, a length of a span corresponding to each CORESET is determined based on a maximum length of each CORESET.

In a possible design, the network device may determine a time domain spacing between any two of a plurality of spans based on a minimum time domain spacing between spans supported by the terminal. For example, the time domain spacing between the any two of the plurality of spans is not less than the minimum time domain spacing between the spans supported by the terminal.

In a possible design, the network device may receive a span spacing capability from the terminal, and the span spacing capability is used to indicate the minimum time domain spacing.

In a possible design, the network device may receive a PDCCH scheduling capability from the terminal, and the PDCCH scheduling capability of the terminal is used to indicate a maximum quantity of PDCCHs detected by the terminal in a span.

According to a third aspect, an embodiment of this application provides a communications apparatus. The communications apparatus may be configured to perform the steps performed by the terminal in any one of the first aspect or the possible designs of the first aspect. The communications apparatus may implement the function, step, or operation in the foregoing method by using a hardware structure, a software module, or a combination of a hardware structure and a software module. For example, a functional module corresponding to the function, step, or operation in the foregoing method may be disposed in the communications apparatus to support the communications apparatus in performing the method.

When the communications apparatus shown in the third aspect is implemented by using a software module, the communications apparatus may include a communications module and a processing module coupled to each other. The communications module may be configured to support the communications apparatus in performing communication. The processing module may be used by the communications apparatus to perform a processing operation, for example, generate information/a message that needs to be sent, or process a received signal to obtain information/a message.

For example, the communications module may be configured to perform a sending action and/or a receiving action performed by the terminal in any one of the first aspect and/or the possible designs of the first aspect, for example, an action of sending information, a message, or signaling by the terminal to the network device, or an action of receiving information, a message, or signaling from the network device, and/or the processing module may be configured to perform a processing action performed by the terminal in any one of the first aspect and/or the possible designs of the first aspect, for example, control the communications module to perform operations such as receiving and/or sending of information, a message, or signaling, and information storage.

When the communications apparatus shown in the third aspect is implemented by using a hardware component, the communications apparatus may include a processor, configured to perform the steps performed by the terminal in any one of the first aspect and/or the possible designs of the first aspect. The communications apparatus may further include a memory. The memory may be configured to store instructions, and the processor may be configured to: invoke the instructions from the memory, and run the instructions, to perform the steps performed by the terminal in any one of the first aspect and/or the possible designs of the first aspect.

The communications apparatus may further include a transceiver (or referred to as a communications interface), configured to support the communications apparatus in performing communication.

For example, the transceiver may be configured to perform a sending action and/or a receiving action performed by the terminal in any one of the first aspect and/or the possible designs of the first aspect, for example, an action of sending information, a message, or signaling by the terminal to the network device, or an action of receiving information, a message, or signaling from the network device, and/or the processor may be configured to perform a processing action performed by the terminal in any one of the first aspect and/or the possible designs of the first aspect, for example, control the transceiver to receive and/or send information, a message, or signaling, and control the memory to store information.

For example, if the communications apparatus is a chip or a chip system, the communications interface may be a component such as an input/output circuit, and the processor may be a logic circuit or a logical unit.

According to a fourth aspect, an embodiment of this application provides a communications apparatus. The communications apparatus may be configured to perform the steps performed by the network device in any one of the second aspect or the possible designs of the second aspect. The communications apparatus may implement the function, step, or operation in the foregoing method by using a hardware structure, a software module, or a combination of a hardware structure and a software module. For example, a functional module corresponding to the function, step, or operation in the foregoing method may be disposed in the communications apparatus to support the communications apparatus in performing the method.

When the communications apparatus shown in the fourth aspect is implemented by using a software module, the communications apparatus may include a communications module and a processing module coupled to each other. The communications module may be configured to support the communications apparatus in performing communication. The processing module may be used by the communications apparatus to perform a processing operation, for example, generate information/a message that needs to be sent, or process a received signal to obtain information/a message.

For example, the communications module may be configured to perform a sending action and/or a receiving action performed by the network device in any one of the second aspect and/or the possible designs of the second aspect, for example, an action of sending information, a message, or signaling by the network device to the terminal, or an action of receiving information, a message, or signaling from the terminal, and/or the processing module may be configured to perform a processing action performed by the network device in any one of the second aspect and/or the possible designs of the second aspect, for example, control the communications module to perform operations such as receiving and/or sending of information, a message, or signaling, and information storage.

When the communications apparatus shown in the fourth aspect is implemented by using a hardware component, the communications apparatus may include a processor, configured to perform the steps performed by the network device in any one of the second aspect and/or the possible designs of the second aspect. The communications apparatus may further include a memory. The memory may be configured to store instructions, and the processor may be configured to: invoke the instructions from the memory, and run the instructions, to perform the steps performed by the network device in any one of the second aspect and/or the possible designs of the second aspect.

The communications apparatus may further include a transceiver (or referred to as a communications interface), configured to support the communications apparatus in performing communication.

For example, the transceiver may be configured to perform a sending action and/or a receiving action performed by the network device in any one of the second aspect and/or the possible designs of the second aspect, for example, an action of sending information, a message, or signaling by the network device to the terminal, or an action of receiving information, a message, or signaling from the terminal, and/or the processor may be configured to perform a processing action performed by the network device in any one of the second aspect and/or the possible designs of the second aspect, for example, control the transceiver to receive and/or send information, a message, or signaling, and control the memory to store information.

For example, if the communications apparatus is a chip or a chip system, the communications interface may be a component such as an input/output circuit, and the processor may be a logic circuit or a logical unit.

According to a fifth aspect, this application provides a communications system. The communications system may include the communications apparatus in the third aspect and the communications apparatus in the fourth aspect. The communications apparatus in the third aspect may include a software module and/or a hardware component. The communications apparatus in the fourth aspect may include a software module and/or a hardware component.

According to a sixth aspect, this application provides a computer-readable storage medium. The computer-readable storage medium stores instructions (or referred to as programs), and when the instructions are invoked and executed on a computer, the computer is enabled to perform the method in any one of the first aspect or the possible designs of the first aspect or the method in any one of the second aspect or the possible designs of the second aspect.

According to a seventh aspect, this application provides a computer program product. The computer program product may include instructions, and when the computer program product is run on a computer, the computer is enabled to perform the method in any one of the first aspect or the possible designs of the first aspect or the method in any one of the second aspect or the possible designs of the second aspect.

According to an eighth aspect, this application provides a chip and/or a chip system that includes a chip. The chip may include a processor. The chip may further include a memory (or a storage module) and/or a transceiver (or a communications module). The chip may be configured to perform the method in any one of the first aspect or the possible designs of the first aspect or the method in any one of the second aspect or the possible designs of the second aspect. The chip system may include the chip, or may include the chip and another discrete component, such as a memory (or a storage module) and/or a transceiver (or a communications module).

For beneficial effects of the second aspect to the eighth aspect and the possible designs of the second aspect to the eighth aspect, refer to descriptions of the beneficial effects of the method according to any one of the first aspect and the possible designs of the first aspect.

DESCRIPTION OF EMBODIMENTS

Figure 1:
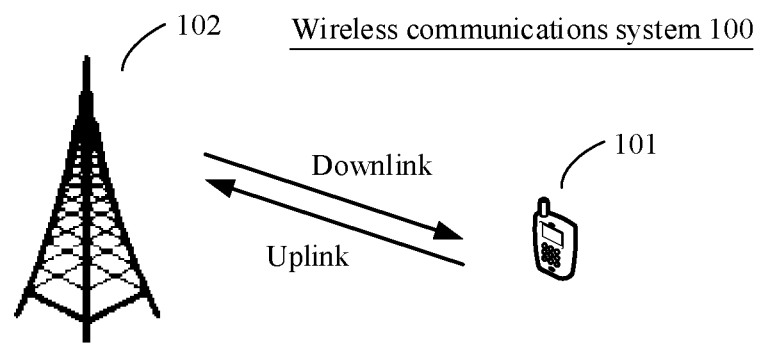
FIG. 1 is a schematic diagram of an architecture of a wireless communications system according to an embodiment of this application.

As shown in FIG. 1, a communication method provided in an embodiment of this application may be applied to a wireless communications system 100. The wireless communications system may include a terminal 101 and a network device 102. The network device 102 may include a plurality of transmission/reception points. The network device 102 implements coordinated transmission of a plurality of PDCCHs by using the plurality of transmission/reception points. The PDCCH may be used to carry DCI.

Optionally, the terminal 101 is configured to support carrier aggregation, and the terminal 101 may be connected to a plurality of carrier components (carrier component) of the network device 102.

It should be understood that the wireless communications system 100 may be applied to both a low frequency scenario (sub 6G) and a high frequency scenario (above 6G). An application scenario of the wireless communications system 100 includes but is not limited to a long term evolution (long term evolution, LTE) system, an LTE frequency division duplex (frequency division duplex, FDD) system, LTE time division duplex (time division duplex, TDD), a universal mobile telecommunications system (universal mobile telecommunication system, UMTS), a worldwide interoperability for microwave access (worldwide interoperability for microwave access, WiMAX) communications system, a cloud radio access network (cloud radio access network, CRAN) system, a future fifth-generation system, a new radio (new radio, NR) communications system, or a future evolved public land mobile network (public land mobile network, PLMN) system.

The terminal 101 may be user equipment (user equipment, UE), a terminal (terminal), an access terminal, a terminal unit, a terminal station, a mobile station (mobile station, MS), a remote station, a remote terminal, a mobile terminal (mobile terminal), a wireless communications device, a terminal agent, a terminal device, or the like. The terminal 101 may have a wireless transceiver function. The terminal 101 can perform communication (for example, wireless communication) with one or more network devices in one or more communications systems, and receive a network service provided by the network device. The network device herein includes but is not limited to the network device 102 shown in the figure.

The terminal 101 may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, a vehicle-mounted device, a wearable device, a terminal device in a future 5G network, a terminal device in a future evolved PLMN, or the like.

Optionally, the terminal 101 may be deployed on the land, including an indoors or outdoors device or a handheld or vehicle-mounted device. Alternatively, the terminal 101 may be deployed on the water (for example, on a ship). Alternatively, the terminal 101 may be deployed in the air (for example, on an airplane, a balloon, and a satellite). The terminal 101 may be specifically a mobile phone (mobile phone), a tablet computer (pad), a computer that has a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The terminal 101 may be a communications chip that includes a communications module.

The network device 102 may be an access network device (or referred to as an access network station). The access network device is a device that provides a network access function, for example, a radio access network (radio access network, RAN) base station. The network device 102 may specifically include a base station (base station, BS), or include a base station, a radio resource management device configured to control the base station, and the like. The network device 102 may alternatively include a relay station (relay device), an access point, a base station in a future 5G network, a base station in a future evolved PLMN network, an NR base station, or the like. The network device 102 may be a wearable device or a vehicle-mounted device. Alternatively, the network device 102 may be a communications chip that includes a communications module.

For example, the network device 102 includes but is not limited to a next generation NodeB (g nodeB, gNB) in 5G, an evolved Node B (evolved node B, eNB) or a radio network controller (radio network controller, RNC) in an LTE system, a NodeB (node B, NB) in a WCDMA system, a radio controller or a base station controller (base station controller, BSC) in a CRAN system, a base transceiver station (base transceiver station, BTS), a home NodeB (for example, home evolved nodeB, or home node B, HNB), a baseband unit (baseband unit, BBU), a transmission/reception point (transmitting and receiving point, TRP), a transmission point (transmitting point, TP), or a mobile switching center in a GSM system or a CDMA system.

Figure 2:
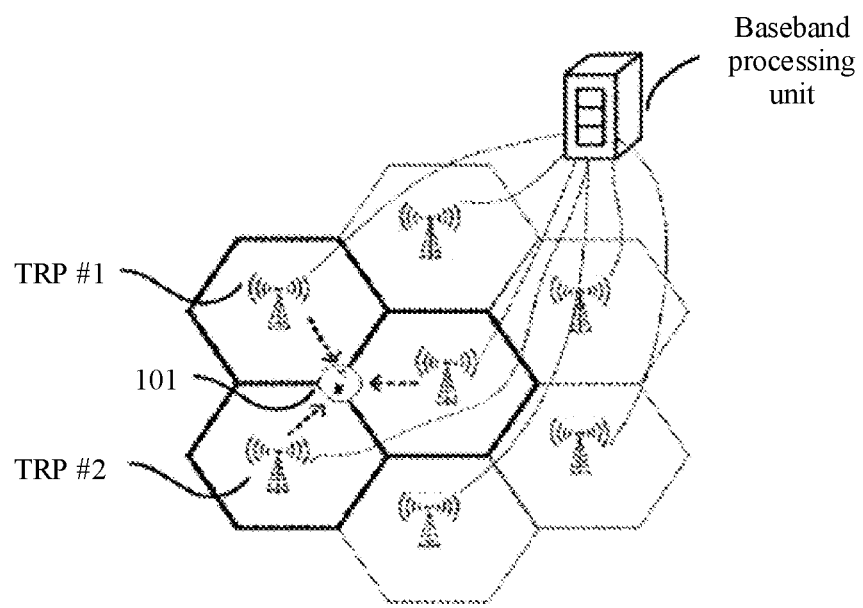
FIG. 2 is a schematic diagram of an architecture of a wireless communications system according to an embodiment of this application.

The plurality of transmission/reception points of the network device 102 may be substantially a group of physical antennas. As shown in FIG. 2, an architecture of the network device 102 may be that one baseband processing unit is at one geographical location, and the baseband processing unit is connected to the plurality of transmission/reception points at a plurality of geographical locations. Each transmission/reception point may include a radio frequency processing unit and an antenna. For example, as shown in FIG. 2, there may be a radio frequency processing unit and a group of antennas at the geographical location of each of the plurality of transmission/reception points. The baseband processing unit may be connected to the radio frequency processing unit of the transmission/reception point through an optical fiber.

Based on the architecture shown in FIG. 2, when coordinated transmission of a plurality of PDCCHs is implemented by using the plurality of transmission/reception points, the baseband processing unit may be configured to: process a baseband signal (for example, generate a signal for transmitting the PDCCHs), and transmit the baseband signal to radio frequency processing units of the plurality of transmission/reception points, and the plurality of transmission/reception points respectively send the PDCCHs through antennas.

Optionally, this embodiment of this application may also be applied to a scenario in which a plurality of TRPs belong to different network devices. For example, the plurality of TRPs belong to different stations, there is a relatively long latency of information exchange between the plurality of stations, and there is a limited capacity. The plurality of PDCCHs are respectively generated by baseband processing units of the network devices, and are respectively sent by these transmission/reception points. That is, the plurality of network devices may relatively independently schedule data in the case of limited interaction.

An embodiment of this application provides a communication method, so that in a multi-transmission/reception point transmission scenario, when a quantity of times that is of blindly detecting a PDCCH and that is configured by a network device 102 for a terminal 101 in a cell corresponding to a transmission/reception point in each slot exceeds a maximum quantity of times that is of blindly detecting the PDCCH and that is supported by the terminal 101 in each slot, the terminal 101 may be prevented from blindly detecting the PDCCH in an overloaded state.

In this application, a maximum quantity of times the terminal 101 blindly detects the PDCCH in a single cell in each slot in a single-cell mode may be used as the maximum quantity of times that is of blindly detecting the PDCCH and that is supported by the terminal 101 in each slot.

For ease of description, the maximum quantity of times that is of blindly detecting the PDCCH in the cell and that is supported by the terminal 101 in each slot in the single-cell mode may be subsequently referred to as a first quantity. Alternatively, a first quantity (or referred to as a first quantity corresponding to a cell) in this application is a maximum quantity of PDCCH candidate locations for the terminal 101 in the cell in each slot in the single-cell transmission mode. The single-cell transmission mode means that no carrier aggregation is configured for the terminal 101, and the terminal 101 works only on a carrier component corresponding to one cell.

For example, in this application, a value of the first quantity may be determined by using a parameter set of a serving cell of the terminal 101 in the single-cell mode (that is, the first quantity corresponds to the parameter set of the serving cell). In this application, a value of the parameter set of the serving cell may be represented as $\mu$, where $\mu \in \{0, 1, 2, 3\}$. When $\mu$ is 0, it indicates that a subcarrier spacing of the serving cell is 15 kilohertz (kHz); when $\mu$ is 1, it indicates that the subcarrier spacing of the serving cell is 30 kHz; when $\mu$ is 2, it indicates that the subcarrier spacing of the serving cell is 60 kHz; and when $\mu$ is 3, it indicates that the subcarrier spacing of the serving cell is 120 kHz. The subcarrier spacing is a spacing between adjacent subcarriers in an orthogonal frequency division multiplexing (orthogonal frequency division multiplexing, OFDM) system.

For example, there may be a correspondence, shown in Table 1, between the value of the parameter set of the serving cell and the value of the first quantity.

TABLE 1

| μ | $M_{PDCCH}^{max, slot, \mu}$ |
|---|---|
| 0 | 44 |
| 1 | 36 |
| 2 | 22 |
| 3 | 20 |

For example, as shown in Table 1, when μ of the serving cell is 0, a quantity of times UE blindly detects the PDCCH in the serving cell in each slot does not exceed 44. That is, when μ is 0, the value of the first quantity is 44.

In implementation of this application, when scheduling the terminal 101, the network device 102 may configure a PDCCH-related parameter, for example, a CORESET and a search space set (search space set, SS set), for the terminal 101.

The CORESET defines a possibility of detecting the PDCCH in frequency domain. The network device 102 may configure information such as an identifier of the CORESET, a demodulation reference signal (demodulation reference signal, DMRS) scrambling ID of the PDCCH, a frequency domain precoding granularity, a symbol length, a frequency domain location, a mapping manner between a CCE and a resource element group (resource element group, REG), a quasi co-location assumption for receiving the PDCCH, and information indicating whether DCI on a PDCCH received in this CORESET includes a transmission configuration indication (transmission configuration indication, TCI) field for the terminal 101.

A search space defines a possibility of detecting the PDCCH in time domain. The network device 102 may configure an identifier of the search space, an identifier of a CORESET associated with the search space, a time unit period and a time unit offset for detecting the PDCCH, a time domain detection pattern (pattern), a quantity (which may include 0) of possible PDCCH candidates for each aggregation level, a type of the search space (which indicates whether the search space is a common search space or a UE-specific search space, where a common search space means that another user may detect the search space), a configuration related to a DCI format (for example, a format possibility of DCI to be detected), and a consecutive length for the terminal 101.

The time domain detection pattern is used to indicate a symbol location at which the UE may detect the PDCCH in a slot. For example, the time domain detection pattern may indicate one or more symbol locations. These symbol locations correspond to first symbol locations at which the possible PDCCHs start. For example, the time domain detection pattern may indicate symbol locations 11, 12, and 13. In this case, the terminal 101 may detect the PDCCH at each of locations whose start symbols are 11, 12, and 13.

The quantity (the quantity may include 0) of possible PDCCH candidates for each aggregation level is a quantity that is of possible PDCCH candidates corresponding to a different aggregation level 1, 2, 4, 8, or 16 and that may be configured by the network device 102 for the terminal 101 in a search space.

The consecutive length is duration of the search space in time domain time units. A slot is used as an example. For example, if a period k is configured by the network device 102 for the terminal 101, and duration is d, it means that starting from a slot that meets the period and offset of the search space, the PDCCH may be detected in the search space in d consecutive slots.

CCE and aggregation level: A basic component unit of the PDCCH is the control channel element (control channel element, CCE). One PDCCH occupies one or more CCEs. A larger quantity of occupied CCEs indicates higher reliability of the PDCCH and more consumed resources. When one user-specific PDCCH occupies a part of CCEs, a PDCCH of another user usually does not occupy the part of CCEs. That is, a limited total quantity of resources can support a limited total quantity of scheduled PDCCHs.

The CCE may include six REGs. A resource of one REG includes a resource block (resource block, RB) in frequency domain and an orthogonal frequency division multiplexing (orthogonal frequency division multiplexing, OFDM) symbol in time domain. There is a mapping relationship between a CCE and an REG. That is, for example, a plurality of REGs that include a plurality of RBs and a plurality of symbols are mapped to the CCE based on some mapping relationships. This type of mapping may be direct mapping (for example, six consecutive REGs form a CCE), interleaved mapping (the REGs are interleaved and then mapped to the CCE), or the like.

A quantity of CCEs forming a PDCCH is referred to as an aggregation level of the CCEs. A user may detect a possibility of a plurality of aggregation levels, for example, 1, 2, 4, 8, or 16. In a specific resource range, the terminal 101 detects the PDCCH by using a possible aggregation level. For example, the terminal 101 attempts to detect, by using an aggregation level 4 and based on a rule, whether there is the PDCCH in a resource that includes four CCEs, and whether the PDCCH can be correctly demodulated. The terminal 101 may make an attempt by using another aggregation level. A possible aggregation level candidate may be configured by the terminal 101 for the terminal 101.

Figure 3:
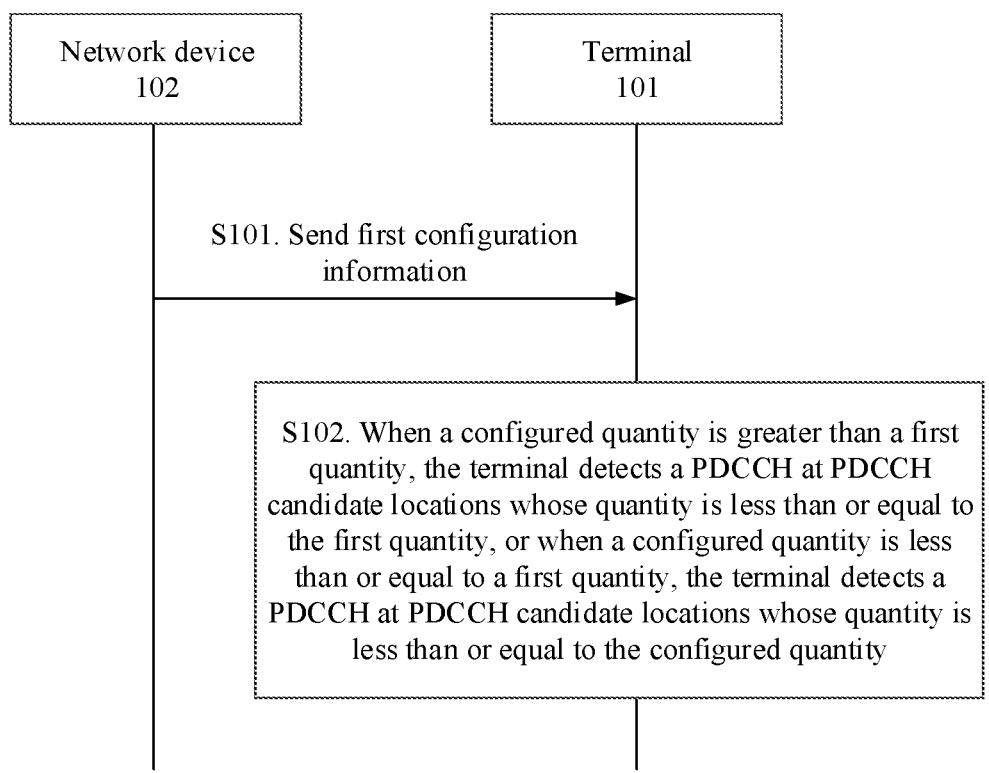
FIG. 3 is a schematic diagram of a communication method according to an embodiment of this application.

As shown in FIG. 3, a communication method provided in an embodiment of this application may include the following steps.

S101. A network device 102 sends first configuration information to a terminal 101, where the first configuration information is used to indicate a configured quantity of PDCCH candidate locations in a time unit corresponding to a first CORESET group.

The configured quantity is greater than a first quantity, and the first quantity is a preset maximum quantity of PDCCH candidate locations in a time unit (for example, a slot) corresponding to a CORESET group in a target cell. A value of the first quantity may be determined by querying Table 1. A PDCCH may be used to carry control information (for example, downlink control information) to be sent by the network device 102 to the terminal 101. The first CORESET group is one of a plurality of CORESET groups in the target cell, and each CORESET group corresponds to one TRP.

It should be understood that the configured quantity may be directly, indirectly, explicitly, or implicitly indicated in the first configuration information. This is not specifically limited in this application. For example, a manner of indicating the configured quantity of PDCCH candidate locations in the first configuration information may be configuring a PDCCH-related parameter such as a CORESET and an SS set. For a specific manner, refer to related description of configuring the PDCCH-related parameter by the network device 102 for the terminal 101 in this application.

The target cell may be one of a plurality of cells in which the terminal 101 works during carrier aggregation.

Correspondingly, the terminal 101 receives the configured quantity of PDCCH candidate locations in the first CORESET group.

S102. When the configured quantity is greater than the first quantity, the terminal 101 detects a PDCCH at PDCCH candidate locations whose quantity is less than or equal to the first quantity, or when the configured quantity is less than or equal to the first quantity, the terminal 101 detects a PDCCH at PDCCH candidate locations whose quantity is less than or equal to the configured quantity.

The first quantity is the preset maximum quantity of PDCCH candidate locations in the time unit corresponding to the CORESET group in the target cell, and the first CORESET group is one of the plurality of CORESET groups in the target cell.

According to the method, the terminal 101 may perform, based on the first configuration information for a maximum of the first quantity of times, blind detection at the PDCCH candidate locations configured by the network device 102 for the first CORESET group. In comparison with a solution, in the conventional technology, in which the terminal 101 blindly detects the PDCCH for all CORESETs in the target cell for a maximum of the first quantity of times, scheduling flexibility can be improved.

The scenario shown in FIG. 2 is used as an example. When the network device 102 performs coordinated transmission of DCI for the terminal 101 by using a TRP #1 and a TRP #2, the terminal 101 blindly detects the PDCCH in a plurality of CORESET groups corresponding to each of the TRP #1 and the TRP #2.The plurality of CORESET groups correspond to the target cell. The network device 102 may send the configured quantity of PDCCH candidate locations in the first CORESET group to the terminal 101. The first CORESET group is a CORESET corresponding to the TRP #1.When the configured quantity of PDCCH candidate locations in the first CORESET group is greater than the first quantity, the terminal 101 blindly detects the PDCCH only at some of the PDCCH candidate locations in the first CORESET group. Specifically, the terminal 101 discards, based on a priority criterion (for example, a preconfigured criterion or a criterion defined in a protocol), some candidates in the PDCCH candidate locations, in the first CORESET group, configured by the network device 102, so that an actual quantity of PDCCH candidate locations at which the terminal 101 performs detection in the first CORESET group does not exceed the first quantity corresponding to the target cell.

The priority criterion includes but is not limited to the following: If there is a same CCE, same scrambling code, a same DCI format, and a same size (quantity of bits) of DCI for a candidate $m_{s_j,n_{CI}}$ for an SS set $s_j$ and a CORSET p and another candidate $m_{s_i,n_{CI}}$ in a cell $n_{CI}$, a candidate is discarded based on a subscript-related rule that $s_i < s_j$ and $n_{s_j,n_{CI}} < m_{s_j,n_{CI}}$. That is, a candidate that meets the condition, namely, a candidate that is in a search space set with a larger number and that is with a larger candidate number, is discarded. That a candidate is discarded means that UE performs no detection at the candidate, and this candidate is not counted in a quantity of candidate locations for detection.

In this application, the priority criterion may be implemented by using pseudocode (pseudocode).

Therefore, according to the method, there may be a limitation that when a plurality of TRPs perform coordinated transmission in a cell, a configured quantity of PDCCH candidate locations in a CORESET associated with only one TRP may exceed a first quantity corresponding to the cell, and when the PDCCH is blindly detected in the CORESET associated with the TRP, an actual quantity of times the terminal 101 performs blind detection does not exceed the first quantity, to prevent the UE from blindly detecting the PDCCH in an overloaded state.

Specifically, in performing S101, the network device 102 may send a configured quantity of PDCCH candidate locations in each CORESET in the first CORESET group to the terminal 101. The terminal 101 may determine time frequency locations of PDCCH candidate locations in each CORESET based on the configured quantity of PDCCH candidate locations in each CORESET, to blindly detect the PDCCH based on these time frequency locations. Therefore, the terminal 101 may determine the time frequency locations of the PDCCH candidate locations in each CORESET in the first CORESET group based on the configured quantity of PDCCH candidate locations in each CORESET in the first CORESET group.

In performing S102, the terminal 101 may determine some candidate locations in all PDCCH candidate locations in the first CORESET group, and blindly detect the PDCCH based on time frequency locations of the some candidate locations.

Optionally, the network device 102 may send first information to the terminal 101, where the first information may be used to indicate the first CORESET group, so that the terminal 101 can be prevented from blindly detecting the PDCCH in the first CORESET group in the overloaded state. The first CORESET group corresponds to the target cell. For example, the first information may include an identifier of each CORESET in the first CORESET group, for example, an index (index) of the CORESET.

Optionally, it may be considered by default that one or more CORESETs corresponding to a cell are the first CORESET group. For example, a primary cell (master cell) that serves the terminal 101 is used as the target cell, and one or more CORESETs corresponding to the primary cell are the first CORESET group.

Optionally, if a quantity of a plurality of TRPs is 2, in all CORESETs, when the network device configures a parameter, for example, a higher layer index (higher layer index), in some CORESETs, and does not configure the parameter in the other CORESETs, it may be determined that the some CORESETs that include the parameter are a CORESET group, and the CORESET group corresponds to a TRP, and it is determined that the other CORESETs that do not include the parameter are another CORESET group, and the another CORESET group corresponds to another TRP.

For example, a CORESET is a CORESET in the first CORESET group provided that the higher layer index is configured in the CORESET. For example, the network device 102 configures three CORESETs, the higher layer index is configured in a CORESET 1 and a CORESET 2, and no higher layer index is configured in a CORESET 3. In this case, the CORESET 1 and the CORESET 2 belong to the first CORESET group.

Optionally, the first CORESET group may be determined in the following manner: A CORESET is a CORESET in the first CORESET group provided that a value of a higher layer index (namely, the first information, which may be another parameter) configured in the CORESET is a specific value. The specific value may be 0, 1, another value, or the like. The value may be indicated by the network device 102, defined in a protocol, or determined in a pre-configuration manner.

For example, the network device 102 configures three CORESETs, a higher layer index that is equal to 0 is configured in a CORESET 1 and a CORESET 2, and a higher layer index that is equal to 1 is configured in a CORESET 3. In this case, if the specific value is 1, it may be determined that the CORESET 3 belongs to the first CORESET group.

Optionally, the specific value may be a maximum value (or a minimum value) in values of higher layer indexes in a plurality of CORESETs in a current cell. For example, the network device 102 configures three CORESETs, a higher layer index that is equal to 0 is configured in a CORESET 1 and a CORESET 2, and a higher layer index that is equal to 1 is configured in a CORESET 3. In this case, if the specific value is the maximum value in the values of the higher layer indexes in the plurality of CORESETs, it may be determined that the CORESET 3 belongs to the first CORESET group. If the specific value is the minimum value in the values of the higher layer indexes in the plurality of CORESETs, it may be determined that the CORESET 1 and the CORESET 2 belong to the first CORESET group.

The specific value may be indicated by the network device 102 to the terminal 101. For example, the network device 102 may notify the terminal 101 that a CORESET is a CORESET in the first CORESET group provided that a parameter configured in the CORESET is a specific value.

Optionally, the network device 102 may notify the terminal 101 that a CORESET in which a specific parameter is configured is a CORESET in the first CORESET group, or the network device 102 may notify the terminal 101 that a CORESET in which a specific parameter is not configured is a CORESET in the first CORESET group.

The foregoing manners of determining the first CORESET group may be combined. For example, when a higher layer index whose value is a specific value is configured in a CORESET or no higher layer index is configured in a CORESET, the UE may determine that the CORESET belongs to the first CORESET group. For example, the network device 102 configures three CORESETs, a higher layer index that is equal to 0 is configured in a CORESET, a higher layer index that is equal to 1 is configured in a CORESET 2, and no higher layer index is configured in a CORESET 3. If the specific value is 1, it may be determined that the CORESET 2 and the CORSET 3 belong to the first CORESET group 3. If the specific value is 0, it may be determined that the CORESET 1 and the CORSET 3 belong to the first CORESET group 3.

Optionally, the first CORESET group may be set for the primary cell of the terminal 101. That is, pseudocode used to determine a quantity of PDCCH candidates is applicable only to PDCCH candidates in specific CORESETs (namely, the first CORESET group) configured in the primary cell. The specific CORESETs are some of a plurality of CORESETs included in the primary cell.

Optionally, pseudocode used to determine a quantity of PDCCH candidates is applicable only to PDCCH candidates in specific CORESETs, with a larger higher layer index, configured in the primary cell (The UE allocates PDCCH candidates for monitoring to USS sets for candidates in the CORESETs with larger higher layer index value in the primary cell having an active DL BWP with SCS configuration μ in slot n according to the following pseudocode).

Alternatively, pseudocode used to determine a quantity of PDCCH candidates is applicable only to PDCCH candidates in specific CORESETs, with a smaller higher layer index, configured in the primary cell (The UE allocates PDCCH candidates for monitoring to USS sets for candidates in the CORESETs with smaller higher layer index value in the primary cell having an active DL BWP with SCS configuration μ in slot n according to the following pseudocode).

Alternatively, pseudocode used to determine a quantity of PDCCH candidates is applicable only to PDCCH candidates in specific CORESETs, with a smaller higher layer index or without a higher layer index, configured in the primary cell (The UE allocates PDCCH candidates for monitoring to USS sets for candidates in the CORESETs with smaller higher layer index value or without higher layer index configured in the primary cell having an active DL BWP with SCS configuration μ in slot n according to the following pseudocode).

Alternatively, pseudocode used to determine a quantity of PDCCH candidates is applicable only to PDCCH candidates in specific CORESETs, with a larger higher layer index or without a higher layer index, configured in the primary cell (The UE allocates PDCCH candidates for monitoring to USS sets for candidates in the CORESETs with higher layer index value or without higher layer index configured in the primary cell having an active DL BWP with SCS configuration μ in slot n according to the following pseudocode).

In this embodiment of this application, when the terminal 101 is configured to support carrier aggregation or the terminal 101 performs coordinated transmission with a plurality of TRPs (the plurality of TRPs correspond to one or more cells), the terminal 101 may determine a maximum quantity of candidate PDCCH locations in each cell in each slot. The terminal 101 may determine, based on a PDCCH blind detection capability $N_{cells}^{cap}$ and the first quantity, a maximum quantity of PDCCH candidate locations in one or more cells in which the terminal 101 works for the terminal 101 in each slot (that is, determine a maximum quantity of times the terminal 101 blindly detects the PDCCH in the one or more cells in each slot). The PDCCH blind detection capability of the terminal 101 is related to a quantity of cells in which the terminal 101 works and a quantity of coordinated cells in the cell in which the terminal 101 works. The coordinated cell means that a plurality of TRPs perform coordinated transmission with the terminal 101 in the cell. Subsequently, in this application, the coordinated cell may also be referred to as a multi-TRP (multi-TRP) cell. Anon-coordinated cell may also be referred to as a single-TRP (single-TRP) cell.

For example, a value of the PDCCH blind detection capability of the terminal 101 is a quantity of transmission/reception points corresponding to the plurality cells. Alternatively, a value of the PDCCH blind detection capability of the terminal 101 is m, and 1≤m≤16. In other words, m is less than 16, and is greater than or equal to 1.

The terminal 101 may send second information to the network device 102, and the second information may be used to indicate the value of the PDCCH blind detection capability.

The following specifically describes, based on different communications scenarios, manners of determining the PDCCH blind detection capability of the terminal 101.

Scenario 1: The terminal 101 works in one serving cell, and the terminal 101 performs coordinated transmission with N1 TRPs in the cell. Therefore, a quantity of CORESET groups in the cell is N1, where N1 is a positive integer greater than 1.

In this scenario, the PDCCH blind detection capability $N_{cells}^{cap}$ of the terminal 101 is equal to a quantity of a plurality of TRPs (or the quantity of CORESET groups in the cell in which the terminal 101 works). That is, the value of the PDCCH blind detection capability is N1, where N1 is a positive integer greater than 1.

For example, in this scenario, a maximum quantity of times the terminal 101 blindly detects the PDCCH in the serving cell in each slot is equal to the first quantity*N1. The first quantity may be determined by querying Table 1 based on a value of a parameter set of the serving cell.

Further, the maximum quantity of times the terminal 101 blindly detects the PDCCH in the serving cell in each slot may be limited to the first quantity*4. This may be represented as follows: The maximum quantity of times is a minimum value between the first quantity*4 and the first quantity*N1. That is, a maximum value of N1 is 4.

Alternatively, the maximum quantity of times is the first quantity*the PDCCH blind detection capability of the terminal 101. This may be represented as follows: The maximum quantity of times is a minimum value between the first quantity*the PDCCH blind detection capability of the terminal 101 and the first quantity*N1. That is, a maximum value of N1 is the PDCCH blind detection capability of the terminal 101.

Optionally, the value of $N_{cells}^{cap}$ may be determined based on a capability of the terminal 101.

For example, the terminal 101 may report one or more multi-TRP coordination capabilities (or referred to as multi-TRP coordination capability parameters) N2 supported by the terminal 101 to the network device 102, where N2 may be an integer or a non-integer. A value of N2 may be greater than or equal to 1, and a maximum value of N2 is a quantity (which is a constant) of transmission/reception points for coordinated transmission, for example, 2 (which may be another value). In addition, N2 may be set as follows: 1≤N2≤2. It should be noted that the terminal 101 may report N2 to the network device 102 by directly, indirectly, explicitly, or implicitly indicating N2 or by using another means, provided that the capability of the terminal 101 can be notified to the network device 102. An implementation is not limited in this application.

A value of each multi-TRP coordination capability N2 may be one of N2 candidate values. There may be one or more N2 candidate values. A same N2 candidate value is configured for the terminal 101 and the network device 102. The plurality of N2 candidate values may be discrete values.

Optionally, the value of N2 may be less than or equal to a value of N1.

The terminal 101 may report the one or more capabilities N2 supported by the terminal 101. When the terminal 101 reports the one or more multi-TRP coordination capabilities N2, $N_{cells}^{cap}$ that may be configured by the network device 102 may be one of the one or more multi-TRP coordination capabilities N2 reported by the terminal 101. Alternatively, compatibility with a smaller value may be implemented for N2 reported by the terminal 101. For example, the N2 candidate values are 1, 1.5, 2, 2.5, . . . , and if the value of N2 reported by the terminal 101 is 2, the network device 102 may select the value of $N_{cells}^{cap}$ from N2 candidate values 1, 1.5, and 2 that are less than or equal to (or less than) 2 and that are in the N2 candidate values.

That is, when the terminal 101 supports only one serving cell, the value of $N_{cells}^{cap}$ is N2 reported by the terminal 101 or a value that is less than or equal to N2 and that is configured by a base station.

After the terminal 101 reports N2, if the network device 102 may select a value from a plurality of values (for example, the terminal 101 reports a plurality of multi-TRP coordination capabilities N2, or the terminal 101 reports N2 that represents a maximum supported capability and compatibility with a smaller value may be implemented in an N2 candidate value range), the network device 102 selects a value from the plurality of values as $N_{cells}^{cap}$, and indicates the value to the terminal 101. In this way, the terminal 101 may know the value selected as $N_{cells}^{cap}$.

Specifically, the value of $N_{cells}^{cap}$ may be indicated to the terminal 101 based on a configuration indication of the PDCCH, for example, a higher layer index (higher layer index) of the PDCCH. Alternatively, the value of $N_{cells}^{cap}$ may be indicated to the terminal 101 based on a quantity of configured cell IDs, that is, indicated by using a quantity of serving cell identifiers or physical cell identifiers configured or used in a cell. Alternatively, the value of $N_{cells}^{cap}$ may be indicated by using signaling (namely, the second information) sent by the network device 102 to the terminal 101. The signaling may be at least one of radio resource control (radio resource control, RRC), a medium access control control element (medium access control-control element, MAC-CE), or DCI.

Scenario 2: The terminal 101 works in a plurality of cells through carrier aggregation.

In this scenario, when a total quantity of a plurality of cells (including a coordinated cell and a non-coordinated cell) configured by the network device 102 is less than 4, $N_{cells}^{cap}$ of the terminal 101 is equal to the total quantity of a plurality of cells. In this case, the UE may not report the value of $N_{cells}^{cap}$.

When the total quantity of a plurality of cells configured by the network device 102 is greater than 4, the value of $N_{cells}^{cap}$ may be determined by the terminal 101, and the terminal 101 may report the value of $N_{cells}^{cap}$ to the network device 102. Alternatively, the value of $N_{cells}^{cap}$ may be equal to a quantity of CORESET groups in the plurality of cells. In this case, the terminal 101 does not report the value, and it may be considered by the network device 102 by default that $N_{cells}^{cap}$ of the terminal 101 is equal to the total quantity of a plurality of cells.

Optionally, the terminal 101 may further determine, by using the following method, whether to report the value of $N_{cells}^{cap}$ to the network device 102:

A multi-TRP coordination capability may be reported at a UE granularity, a frequency band combination granularity, or a frequency band granularity. That a multi-TRP coordination capability is reported at a UE granularity means that the terminal 101 reports only one value of $N_{cells}^{cap}$ without making a distinction for frequency bands. Therefore, a frequency band range to which the value is applicable is not limited.

In a method 1, whether to report the value of $N_{cells}^{cap}$ is determined based on a quantity of carriers supported by the terminal 101 and a value of the multi-TRP coordination capability N2 supported by the terminal 101.

The quantity of carriers supported by the terminal 101 is a quantity of carriers supported by the terminal 101 for simultaneous access. For example, the quantity of carriers supported by the terminal 101 may be the total quantity of a plurality of cells configured by the network device 102.

When the quantity of carriers supported by the terminal 101 is greater than a ratio of 4 to the multi-TRP coordination capability N2 (or a maximum value in values of one or more multi-TRP coordination capabilities N2 reported by the terminal 101) supported by the terminal 101, the terminal 101 needs to report the value of $N_{cells}^{cap}$. That is, when the multi-TRP coordination capability supported by the terminal 101 is N2, and the terminal 101 supports at least (4/N2) carriers, the terminal 101 needs to report the value of $N_{cells}^{cap}$.

For example, a value of N2 may be 1 or 2. When the value of N2 reported by the terminal 101 is 2, and the terminal 101 supports at least two CCs, the terminal 101 needs to report the value of $N_{cells}^{cap}$. For another example, the value of N2 may be 1 or 2, and the terminal 101 may report a plurality of multi-TRP coordination capabilities N2. When values of two multi-TRP coordination capabilities N2 reported by the terminal 101 are respectively 1 and 2, and the terminal 101 supports at least two CCs, the terminal 101 needs to report the value of $N_{cells}^{cap}$.

That is, based on the method 1, when the terminal 101 supports carrier aggregation, when the terminal 101 reports the value of $N_{cells}^{cap}$, the value of the PDCCH blind detection capability $N_{cells}^{cap}$ of the terminal 101 is a value reported by the terminal 101. When the UE does not report $N_{cells}^{cap}$, the value of the PDCCH blind detection capability $N_{cells}^{cap}$ of the terminal 101 is a value obtained by performing summation on a quantity of non-coordinated cells and a product of a quantity of coordinated cells and N2. The value of N2 is reported by the terminal 101.

The value of $N_{cells}^{cap}$ may be expressed in the following formula: M1*N2+M2, where M1 is the quantity of coordinated cells, and M2 is the quantity of non-coordinated cells.

In addition, the terminal 101 reports the capability herein. Therefore, the quantity of coordinated cells and the quantity of non-coordinated cells herein are respectively a quantity of cells for which a plurality of CORESET groups may be configured and a quantity of cells for which a plurality of CORESET groups are not configured (are not supported).

In a method 2, whether to report the value of $N_{cells}^{cap}$ is determined based on a quantity of carriers supported by the terminal 101 and information indicating whether the terminal 101 supports a multi-transmission/reception point coordination capability.

The information indicating whether the terminal 101 supports the multi-transmission/reception point coordination capability may be used to indicate whether the terminal 101 supports multi-transmission/reception point coordination. When the terminal 101 supports multi-transmission/reception point coordination, the multi-TRP coordination capability N2 supported by the terminal 101 is a fixed value (for example, 2). In addition, the terminal 101 may report the information indicating whether the terminal 101 supports the multi-transmission/reception point coordination capability to the network device 102.

In this way, if the quantity of carriers supported by the terminal 101 is greater than a ratio of 4 to the fixed value, the terminal 101 needs to report the value of $N_{cells}^{cap}$.

For example, when the fixed value is 2, if the terminal 101 supports at least two (namely, 4/2) carriers, the terminal 101 needs to report the value of $N_{cells}^{cap}$.

In a simplified application scenario, all cells include only a non-coordinated cell and/or a coordinated cell in which there are two TRPs for coordinated transmission, and it is assumed that there are M1 coordinated cells and M2 non-coordinated cells. That is, in the method 2, when the terminal 101 supports carrier aggregation, when the terminal 101 reports the value of $N_{cells}^{cap}$, the value of the PDCCH blind detection capability $N_{cells}^{cap}$ of the terminal 101 is a value reported by the terminal 101. When the UE does not report $N_{cells}^{cap}$, the value of the PDCCH blind detection capability $N_{cells}^{cap}$ of the terminal 101 is a value obtained by performing summation on the quantity of non-coordinated cells and a product of the quantity of coordinated cells and the fixed value.

In addition, the terminal 101 reports the capability herein. Therefore, the quantity of coordinated cells and the quantity of non-coordinated cells herein are respectively a quantity of cells for which a plurality of CORESET groups may be configured and a quantity of cells for which a plurality of CORESET groups are not configured (are not supported).

In a method 3, whether to report the value of $N_{cells}^{cap}$ is determined based on a multicarrier aggregation capability of the terminal 101 at each frequency band.

The multicarrier aggregation capability of the terminal 101 at each frequency band is a product of a quantity of carriers supported by the terminal 101 and a multi-TRP coordination capability N3 of the terminal 101 at each frequency band. The terminal 101 may further report the multicarrier aggregation capability at each frequency band to the network device 102.

A value of N3 corresponds to a frequency band, and the frequency band herein may be a frequency band combination or a frequency band. N3 is greater than or equal to 1, and a maximum value of N3 is a quantity (which is a constant) of transmission/reception points for coordinated transmission, for example, 2 (which may be another value). For a manner of determining a value of N3 corresponding to each frequency band, refer to the manner of determining the value of N2 in this application. $N_{cells}^{cap}$ configured by the network device 102 is one of one or more multi-TRP coordination capabilities N2 reported by the terminal 101. Alternatively, compatibility with a smaller value may be implemented for N2 reported by the terminal 101. For example, N2 candidate values are 1, 1.5, 2, 2.5, ... , and if a value of N2 reported by the terminal 101 is 2, the network device 102 may select the value of $N_{cells}^{cap}$ from N2 candidate values 1, 1.5, and 2 that are less than or equal to (or less than) 2 and that are in the N2 candidate values.

For example, when a total sum of multicarrier aggregation capabilities supported by the terminal 101 at a plurality of frequency bands is greater than 4, the terminal 10 needs to report the value of $N_{cells}^{cap}$.

The terminal 10 may further report a multi-TRP coordination capability at each of frequency bands 1 to K. The multi-TRP coordination capability is denoted as N3i, where i=1-K, and i represents the frequency bands 1 to K. For example, frequency bands supported by the terminal 101 include the frequency bands 1 to K, and the terminal 10 may report blind detection capabilities N31 to N3K at the frequency bands 1 to K. When the terminal 10 reports a plurality of capabilities N3 at one frequency band, a maximum capability in values of the plurality of reported capabilities N3 is used to calculate a multicarrier aggregation capability at the frequency band.

That is, based on the method 3, when the terminal 101 supports carrier aggregation, when the terminal 101 reports the value of $N_{cells}^{cap}$, the value of the PDCCH blind detection capability $N_{cells}^{cap}$ of the terminal 101 is a value reported by the terminal 101. When the UE does not report $N_{cells}^{cap}$, the value of the PDCCH blind detection capability $N_{cells}^{cap}$ of the terminal 101 is a value obtained by performing summation on quantities of non-coordinated cells at all the frequency bands and a sum of products of quantities of coordinated cells at all the frequency bands/frequency band combinations and capabilities N3i reported by the terminal 101 at all the frequency bands/frequency band combinations.

Alternatively, when the terminal 101 reports the value of $N_{cells}^{cap}$, the value of the PDCCH blind detection capability $N_{cells}^{cap}$ of the terminal 101 is a value reported by the terminal 101. When the UE does not report $N_{cells}^{cap}$, the value of the PDCCH blind detection capability $N_{cells}^{cap}$ of the terminal 101 is a value obtained by performing summation on quantities of non-coordinated cells at all the frequency bands and products of quantities of coordinated cells and a function transformation result of capabilities N3i reported by the terminal 101 at all the frequency bands/frequency band combinations. The function transformation result of the capabilities N3i reported by the terminal 101 at all the frequency bands/frequency band combinations may be a maximum value, a minimum value, an average value, or the like of the capabilities N3i reported by the terminal 101 at all the frequency bands/frequency band combinations.

In addition, the terminal 101 reports the capability herein. Therefore, the quantity of coordinated cells and the quantity of non-coordinated cells herein are respectively a quantity of cells for which a plurality of CORESET groups may be configured and a quantity of cells for which a plurality of CORESET groups are not configured (are not supported).

In a method 4, whether to report the value of $N_{cells}^{cap}$ is determined based on both a quantity of carriers and a coordination capability supported by the terminal 101 at each frequency band.

For example, when the terminal 101 works at frequency bands 1 to K, and a value (which may be denoted as N4 below) determined based on both the quantity of carriers and the multi-TRP coordination capability N3 supported by the terminal 101 at each frequency band is greater than 4, the terminal 101 needs to report the value of $N_{cells}^{cap}$.

The terminal 101 may report information indicating whether the terminal 101 supports a multi-transmission/reception point coordination capability at each frequency band. The frequency band herein may be a frequency band combination or a frequency band. For example, the terminal 101 may report information indicating whether the multi-transmission/reception point coordination capability is supported at each of the frequency bands 1 to K. The multi-transmission/reception point coordination capability is denoted as Si, where i=1 to K, and i represents the frequency bands 1 to K. A value of Si is 0 or 1.

When the terminal 101 supports multi-transmission/reception point coordination at a frequency band, a value of a multi-TRP coordination capability N3 of the terminal 101 at the frequency band is a fixed value, and may be denoted as A herein.

In this example, a value of N4 may be determined based on the following method: It is assumed that a quantity of carriers at each of the frequency bands 1 to K may be denoted as Ci, where i=1 to K. In this case, when Si is 0, N4 may be denoted as Ci. When Si is 1, N4 at the frequency band may be denoted as Ci*A.

For example, $N_{trp,c}$ is a quantity of TRPs in a cell c. The quantity of TRPs may be equal to a quantity of CORESET groups. There may be one or more TRPs. In this example, the value of the PDCCH blind detection capability N7, of the terminal 101 may be $$\sum_{c=0}^{cmax} N_{trp,c},$$

namely, a total sum of quantities of TRPs in a plurality of cells (namely, a quantity of CORESET groups in the plurality of cells).

That is, based on the method 4, when the terminal 101 supports carrier aggregation, when the terminal 101 reports the value of $N_{cells}^{cap}$, the value of the PDCCH blind detection capability $N_{cells}^{cap}$ of the terminal 101 is a value reported by the terminal 101. When the UE does not report $N_{cells}^{cap}$, the value of the PDCCH blind detection capability $N_{cells}^{cap}$ of the terminal 101 is a value obtained by performing summation on quantities of non-coordinated cells at all the frequency bands and a sum of products of quantities of coordinated cells at all the frequency bands/frequency band combinations and the fixed value.

In addition, the terminal 101 reports the capability herein. Therefore, the quantity of coordinated cells and the quantity of non-coordinated cells herein are respectively a quantity of cells for which a plurality of CORESET groups may be configured and a quantity of cells for which a plurality of CORESET groups are not configured (are not supported).

In a specific example, a cell #1 corresponds to a TRP #1 and a TRP #2, a cell #2 corresponds to a TRP #3, each of the TRP #1 and the TRP #2 corresponds to one CORESET group in the cell #1, and the TRP #3 corresponds to one CORESET group in the cell #2. Therefore, a quantity of CORESET groups in the cell #1 and the cell #2 is 3. A quantity of CORESET groups in the cell #1 is 2, and a quantity of CORESET groups in the cell #2 is 1. When the terminal 101 performs transmission by using the cell #1 and the cell #2, the value of the PDCCH blind detection capability $N_{cells}^{cap}$ of the terminal 101 may be 3.

In a simplified application scenario, all cells include only a non-coordinated cell and/or a coordinated cell in which there are two TRPs for coordinated transmission, and it is assumed that there are M1 coordinated cells and M2 non-coordinated cells. In this case, the value of the PDCCH blind detection capability $N_{cells}^{cap}$ of the terminal 101 may be M1*2+M2.

For example, a value of a blind detection capability of the terminal 101 in each of a plurality of cells may be used to determine a maximum quantity of times the terminal 101 blindly detects the PDCCH in each of the plurality of cells in each slot. For example, when values of parameter sets of the plurality of cells are equal, the maximum quantity of times the terminal 101 blindly detects the PDCCH in each of the plurality of cells in each slot is equal to a value obtained by multiplying a first quantity corresponding to the value of the parameter set by $N_{cells}^{cap}$.

Optionally, if the values of the parameter sets of the plurality of cells are the same, a quantity of times the terminal 101 blindly detects the PDCCH in a time unit corresponding to each CORESET group in each cell is equal to $M_{PDCCH}^{max,slot,\mu}$ obtained by querying Table 1 based on the value of the parameter set of the cell.

In addition, in this example, if the values of the parameter sets of the plurality of cells are the same, a maximum quantity of non-overlapping CCEs blindly detected by the terminal 101 in the time unit corresponding to each CORESET group in each cell is equal to $C_{PDCCH}^{max,slot,\mu}$ obtained by querying Table 1 based on the value of the parameter set of the cell.

As shown in Table 2, $C_{PDCCH}^{max,slot,\mu}$ corresponds to the value of the parameter set of each cell.

TABLE 2

| $\mu$ | $C_{PDCCH}^{max,\ slot,\ \mu}$ |
|---|---|
| 0 | 56 |
| 1 | 56 |
| 2 | 48 |
| 3 | 32 |

Optionally, a third quantity may be determined based on the PDCCH blind detection capability of the terminal 101 and a second quantity. The second quantity is a specified maximum quantity of PDCCH candidate locations in a time unit corresponding to a CORESET group in a first cell. The third quantity is a specified maximum quantity of PDCCH candidate locations in a time unit corresponding to the first cell. The first cell includes one or more cells that are in the plurality of cells and whose parameter sets have a same value. A quantity of times the terminal 101 blindly detects the PDCCH in a time unit corresponding to each CORESET group in the first cell does not exceed the second quantity and the third quantity.

Optionally, a quantity of times the terminal blindly detects the PDCCH in the time unit corresponding to the first cell does not exceed a product of the second quantity and a quantity of CORESET groups in the first cell.

For example, the first cell is a cell that is in the plurality of cells in which the terminal 101 works and whose parameter set has a value of μ. In this case, the second quantity may be $M_{PDCCH}^{max,slot,\mu}$ obtained by querying Table 1 based on μ.

For example, if parameter sets of at least two of the plurality of cells in which the terminal 101 works have different values, the third quantity may be determined based on the following formula:

$$M_{PDCCH}^{total,slot,\mu} = \left\lfloor N_{cells}^{cap} \cdot M_{PDCCH}^{max,slot,\mu} \cdot \left( \sum_{c=0}^{cells} N_c^{DL,\mu,trp} \right) \Big/ \left( \sum_{j=0}^{3} \sum_{c=0}^{cells} N_c^{DL,j,trp} \right) \right\rfloor,$$

where $M_{PDCCH}^{max,slot,\mu}$ represents a maximum quantity of times the terminal 101 blindly detects the PDCCH in one or more cells c (namely, the first cell) whose numerology is μ in each slot, $N_{cells}^{cap}$ represents the PDCCH blind detection capability of the terminal 101, $N_c^{DL,\mu,trp}$ is a quantity of TRPs (namely, a quantity of CORESET groups in the cell c) in the cell c whose numerology is μ, and $$\sum_{j=0}^{3} \sum_{c=0}^{cells} N_c^{DL,j,trp}$$

represents a total quantity of TRPs (namely, a quantity of CORESET groups in cells) in all the cells.

When a quantity $N_c^{DL,\mu,trp}$ of TRPs in each coordinated cell is equal to n1, the foregoing formula may be converted as follows:

$$M_{PDCCH}^{total,slot,\mu} = \left\lfloor N_{cells}^{cap} \cdot M_{PDCCH}^{max,slot,\mu} \cdot \left( N_{cells}^{DL,\mu,mulit-trp} * n1 + N_{cells}^{DL,\mu,single-trp} \right) \Big/ \sum_{j=0}^{3} \left( N_{cells}^{DL,j,multi-trp} * n1 + N_{cells}^{DL,j,single-trp} \right) \right\rfloor,$$

where $N_c^{DL,\mu,multi-trp}$ represents a quantity of coordinated cells c whose numerology is μ, $N_c^{DL,\mu,single-trp}$ represents a quantity of non-coordinated cells c whose numerology is μ, $N_{cells}^{DL,j,multi-trp}$ represents a quantity of coordinated cells in all the cells, and $N_{cells}^{DL,j,single-trp}$ represents a quantity of non-coordinated cells in all the cells.

Further, when all the cells include only a non-coordinated cell (or a single-TRP cell) and/or a coordinated cell (or a multi-TRP cell) in which there are two TRPs for coordinated transmission, that is, when n1 is 2, the foregoing formula may be further converted as follows:

$$M_{PDCCH}^{total,slot,\mu} = \left\lfloor N_{cells}^{cap} \cdot M_{PDCCH}^{max,slot,\mu} \cdot \left( N_{cells}^{DL,\mu,mulit-trp} * 2 + N_{cells}^{DL,\mu,single-trp} \right) \Big/ \sum_{j=0}^{3} \left( N_{cells}^{DL,j,multi-trp} * 2 + N_{cells}^{DL,j,single-trp} \right) \right\rfloor.$$

It should be understood that a sum of a quantity of single-TRP cells and a quantity of multi-TRP cells is a quantity of all cells configured by the network device 102 for the terminal 101.

For example, a quantity of times the terminal 101 blindly detects the PDCCH in a time unit corresponding to each CORESET in each cell configured by the network device 102 cannot exceed either $M_{PDCCH}^{total,slot,\mu}$ or $M_{PDCCH}^{max,slot,\mu}$. That is, the quantity of times the terminal 101 performs blind detection in the time unit corresponding to each CORESET in each cell configured by the network device 102 should not exceed min($M_{PDCCH}^{max,slot,\mu}$, $M_{PDCCH}^{total,slot,\mu}$).

For example, a value of $N_c^{DL,\mu,trp}$ may be obtained based on a capability of the terminal 101. It should be understood that specifically, $N_c^{DL,\mu,trp}$ in the formula may be determined based on the capability of the terminal 101, or n1 is obtained based on the capability of the terminal 101. The following provides description by using an example in which the network device 102 determines $N_c^{DL,\mu,trp}$. A same method may be used to determine n1.

Specifically, the terminal 101 may report one or more multi-TRP coordination capabilities N2 supported by the terminal 101 to the network device 102. N2 is greater than or equal to 1, and a maximum value of N2 is a quantity (which is a constant) of transmission/reception points for coordinated transmission, for example, 2 (which may be another value). N2 may be a non-integer. Optionally, N2 may be set as follows: 1≤N2≤2.

A value of each multi-TRP coordination capability N2 may be one of N2 candidate values. There may be one or more N2 candidate values. A same N2 candidate value is configured for the terminal 101 and the network device 102. The plurality of N2 candidate values may be discrete values.

For example, the value of N2 may be less than or equal to a value of n1.

The terminal 101 may report the one or more capabilities N2 supported by the terminal 101. When the terminal 101 reports the one or more multi-TRP coordination capabilities N2, $N_c^{DL,\mu,trp}$ that may be configured by the network device 102 may be one of the one or more multi-TRP coordination capabilities N2 reported by the terminal 101. Alternatively, compatibility with a smaller value may be implemented for N2 reported by the terminal 101. For example, the N2 candidate values are 1, 1.5, 2, 2.5, . . . , and if the value of N2 reported by the terminal 101 is 2, the network device 102 may select the value of $N_c^{DL,\mu,trp}$ from N2 candidate values 1, 1.5, and 2 that are less than or equal to (or less than) 2 and that are in the N2 candidate values.

After the terminal 101 reports N2, if the network device 102 may select a value from a plurality of values (for example, the terminal 101 reports a plurality of multi-TRP coordination capabilities N2, or the terminal 101 reports N2 that represents a maximum supported capability and compatibility with a smaller value may be implemented in an N2 candidate value range), the network device 102 selects a value from the plurality of values as $N_c^{DL,\mu,trp}$, and indicates the value to the terminal 101. In this way, the terminal 101 may know the value selected as $N_c^{DL,\mu,trp}$. Alternatively, the network device 102 selects a value from the plurality of values as n1, and indicates the value to the terminal 101. In this way, the terminal 101 may know the value selected as n1.

Specifically, the value of $N_c^{DL,\mu,trp}$ may be obtained based on a configuration of the PDCCH, for example, obtained based on a higher layer index of the PDCCH. Alternatively, the value of $N_c^{DL,\mu,trp}$ may be obtained based on a quantity of configured cell IDs, that is, obtained by using a quantity of serving cell identifiers or physical cell identifiers configured or used in a cell. Alternatively, the value of $N_c^{DL,\mu,trp}$ may be indicated by the network device 102 to the terminal 101. Signaling for indication may be at least one of RRC, a MAC CE, or DCI.

The terminal 101 may report a value at a UE granularity, a frequency band combination granularity, or a frequency band granularity. When the network device 102 indicates $N_c^{DL,\mu,trp}$ or n1, the network device may indicate, for each frequency band/frequency band combination, $N_c^{DL,\mu,trp}$ or n1 that is less than or equal to a value reported by the terminal 101 at the frequency band/frequency band combination. Alternatively, the network device may indicate, to the UE, $N_c^{DL,\mu,trp}$ or n1 that is less than or equal to a value reported by the terminal 101 at each frequency band/frequency band combination.

When the value of $N_c^{DL,\mu,trp}$ in the formula or n1 is a value reported by the terminal 101, the UE may report different values at all frequency bands/frequency band combinations, and therefore $N_c^{DL,\mu,trp}$ in the formula or n1 needs to be corrected. There are the following possible cases: (1) $N_c^{DL,\mu,trp}$ in the formula or n1 is one of the values reported by the UE at all the frequency bands/frequency band combinations, for example, a function transformation result of capabilities reported by the terminal 101 at all the frequency bands/frequency band combinations. For example, the function transformation result may be a maximum value, a minimum value, or an average value of the capabilities N3i reported by the terminal 101 at all the frequency bands/frequency band combinations. (2) $N_c^{DL,\mu,trp}$ in the formula or n1 is a value reported by the UE at each frequency band/frequency band combination, and the quantity of coordinated cells and the quantity of non-coordinated cells in the formula are a corresponding quantity of coordinated cells and a corresponding quantity of non-coordinated cells at each frequency band. Therefore, $N_{cells}^{DL,\mu,multi-trp}*n1+N_{cells}^{DL,j,single-trp}$ in the formula is a total sum of $N_{cells}^{DL,\mu,multi-trp}*n1+N_{cells}^{DL,\mu,single-trp}$ at all the frequency bands/frequency band combinations, and $$\sum_{j=0}^{3}\left(N_{cells}^{DL,j,multi-trp}*n1+N_{cells}^{DL,j,single-trp}\right)$$

in the formula is a total sum of $$\sum_{j=0}^{3}\left(N_{cells}^{DL,j,multi-trp}*n1+N_{cells}^{DL,j,single-trp}\right)$$

at all the frequency bands/frequency band combinations. For $N_c^{DL,\mu,trp}$, processing may be performed with reference to the foregoing description. No examples are provided.

In the foregoing example, if the target cell is one cell of the plurality of cells in which the terminal works, the terminal 101 may determine a fifth quantity based on the PDCCH blind detection capability and a fourth quantity. The fourth quantity is a specified maximum quantity of non-overlapping CCEs in a time unit corresponding to a CORESET group in a second cell in the plurality of cells. The fifth quantity is a maximum quantity of non-overlapping CCEs in a time unit corresponding to the second cell. The second cell includes one or more cells that are in the plurality of cells and whose parameter sets have a same value.

For example, a quantity of non-overlapping CCEs detected by the terminal 101 in a time unit corresponding to each CORESET group in the second cell does not exceed the fourth quantity and the fifth quantity.

Optionally, a quantity of non-overlapping CCEs detected by the terminal 101 in the time unit corresponding to the second cell does not exceed a product of the fourth quantity and a quantity of CORESET groups in the second cell.

For example, the second cell is a cell that is in the plurality of cells in which the terminal 101 works and whose parameter set has a value of $\mu$. In this case, the fourth quantity may be $C_{PDCCH}^{max,slot,\mu}$ obtained by querying Table 2 based on $\mu$.

For example, if parameter sets of at least two of the plurality of cells in which the terminal 101 works have different values, the fifth quantity may be determined based on the following formula:

$$C_{PDCCH}^{total,slot,\mu} = \left[ N_{cells}^{cap} \cdot C_{PDCCH}^{max,slot,\mu} \cdot \left(\sum_{c=0}^{cells} N_c^{DL,\mu,trp}\right) \middle/ \left(\sum_{j=0}^{3}\sum_{c=0}^{cells} N_c^{DL,j,trp}\right)\right],$$

where $C_{PDCCH}^{total,slot,\mu}$ represents a maximum quantity of non-overlapping CCEs in one or more cells c (namely, the second cell) whose numerology has a value of $\mu$, $N_{cells}^{cap}$ represents the PDCCH blind detection capability of the terminal 101, $C_{PDCCH}^{max,slot,\mu}$ represents the fourth quantity, $N_c^{DL,\mu,trp}$ is a quantity of TRPs (namely, a quantity of CORESET groups in the cell c) in the cell c whose numerology is $\mu$, and $$\sum_{j=0}^{3}\sum_{c=0}^{cells} N_c^{DL,j,trp}$$

represents a total quantity of TRPs (namely, a quantity of CORESET groups in cells) in all the cells.

When a quantity $N_c^{DL,\mu,trp}$ of TRPs in each coordinated cell is equal to n1, the foregoing formula may be converted as follows:

$$C_{PDCCH}^{total,slot,\mu} = \left[ N_{cells}^{cap} \cdot C_{PDCCH}^{max,slot,\mu} \cdot \left(N_{cells}^{DL,\mu,mulit-trp}*n1+N_{cells}^{DL,\mu,single-trp}\right) \middle/ \sum_{j=0}^{3}\left(N_{cells}^{DL,j,multi-trp}*n1+N_{cells}^{DL,j,single-trp}\right)\right],$$

where $N_c^{DL,\mu,multi-trp}$ represents a quantity of coordinated cells c whose numerology is µ, $N_c^{DL,\mu,single-trp}$ represents a quantity of non-coordinated cells c whose numerology is µ, $N_{cells}^{DL,j,multi-trp}$ represents a quantity of coordinated cells in all the cells, and $N_{cells}^{DL,j,single-trp}$ represents a quantity of non-coordinated cells in all the cells.

Further, when all the cells include only a non-coordinated cell (or a single-TRP cell) and/or a coordinated cell (or a multi-TRP cell) in which there are two TRPs for coordinated transmission, that is, when n1 is 2, the foregoing formula may be further converted as follows:

$$C_{PDCCH}^{total,slot,\mu} = \left\lfloor N_{cells}^{cap} \cdot C_{PDCCH}^{max,slot,\mu} \cdot \right.$$

$$\left. \left(N_{cells}^{DL,\mu,mulit-trp} * 2 + N_{cells}^{DL,\mu,single-trp}\right) \middle/ \sum_{j=0}^{3} \left(N_{cells}^{DL,j,multi-trp} * 2 + N_{cells}^{DL,j,single-trp}\right) \right\rfloor.$$

It should be understood that a sum of a quantity of single-TRP cells and a quantity of multi-TRP cells is a quantity of all cells configured by the network device 102 for the terminal 101.

For example, a quantity of non-overlapping CCEs blindly detected by the terminal 101 in a time unit corresponding to each CORESET group in each cell configured by the network device 102 cannot exceed either $C_{PDCCH}^{total,slot,\mu}$ or $C_{PDCCH}^{max,slot,\mu}$. That is, the quantity of non-overlapping CCEs blindly detected by the terminal 101 in the time unit corresponding to each CORESET group in each cell configured by the network device 102 does not exceed min $(C_{PDCCH}^{max,slot,\mu}, C_{PDCCH}^{total,slot,\mu})$.

Specifically, herein, a value of $N_c^{DL,\mu,trp}$, n1, or the like is described above.

Currently, it is defined in NR that the terminal 101 may detect a PDCCH in a monitoring occasion (span) corresponding to only one CORESET. When the network device 102 performs coordinated transmission of DCI of the terminal 101 by using a plurality of TRPs, the network device 102 configures a plurality of CORESETs for the terminal 101, and there may be a case such as a case in which time domain locations of spans determined based on the plurality of CORESETs overlap. Consequently, disorder occurs when the terminal 101 blindly detects the PDCCH in a span associated with each CORESET.

An embodiment of this application further provides another communication method. A network device 102 performs coordinated transmission of DCI of a terminal 101 by using a plurality of TRPs, and the terminal 101 blindly detects a PDCCH in a CORESET corresponding to each TRP, to avoid disorder during blind detection of the PDCCH. The PDCCH is used to carry the DCI.

Figure 4:
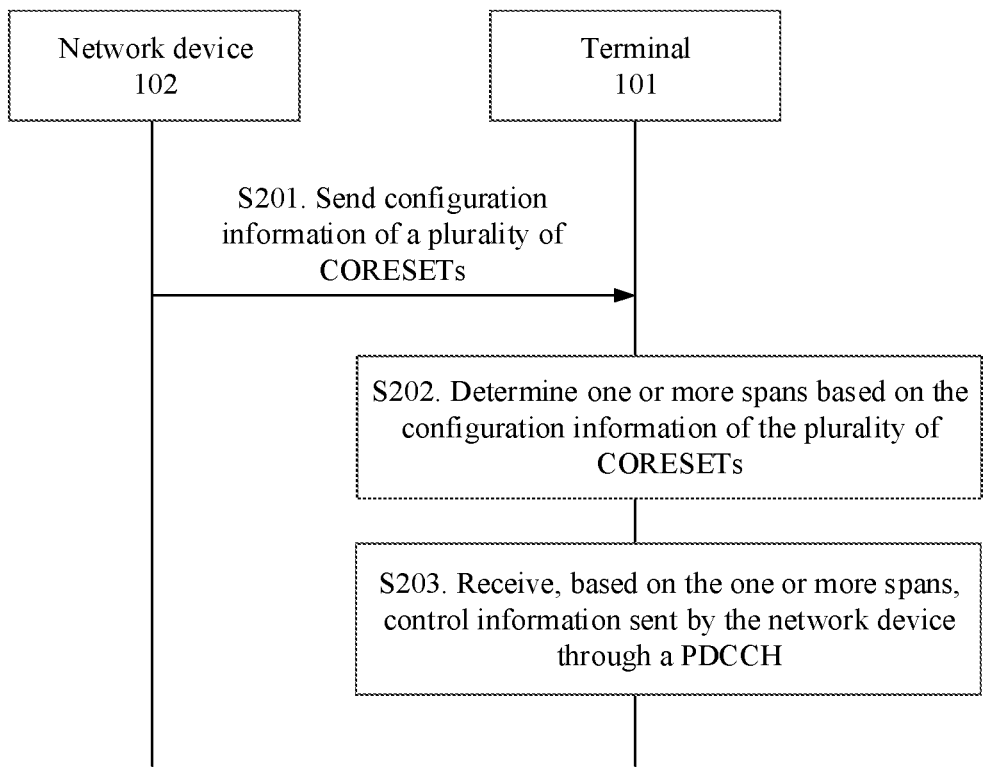
FIG. 4 is a schematic diagram of a communication method according to an embodiment of this application.

As shown in FIG. 4, the communication method may include the following steps.

S201. The network device 102 sends configuration information of a plurality of CORESETs to the terminal 101, where each CORESET is used to indicate a downlink control channel PDCCH candidate location corresponding to the CORESET, and each CORESET corresponds to one TRP of the network device.

Correspondingly, the terminal 101 receives the configuration information of the plurality of CORESETs.

S202. The terminal 101 determines one or more spans based on the configuration information of the plurality of CORESETs, where each span is used to indicate duration of monitoring the PDCCH by the terminal.

S203. The terminal 101 receives, based on the one or more spans, control information sent by the network device through the PDCCH.

In an example of S202, the terminal 101 may determine, based on the configuration information of the plurality of CORESETs, a plurality of spans associated with the plurality of CORESETs. Each CORESET is associated with one span.

Specifically, the terminal 101 may determine a length of the span based on a maximum length (duration) of each CORESET.

Further, the terminal 101 may determine whether a time domain spacing between any two spans is not less than a minimum time domain spacing between spans supported by the terminal 101. The minimum time domain spacing between the spans supported by the terminal 101 may be Z time domain symbols, where Z is an integer. When Z is a negative integer, it indicates that the terminal 101 supports overlapping between a plurality of spans. When Z is a non-negative integer, it indicates that the terminal 101 does not support overlapping between a plurality of spans, and a minimum spacing between any two of the plurality of spans is Z time domain symbols.

Figure 5:
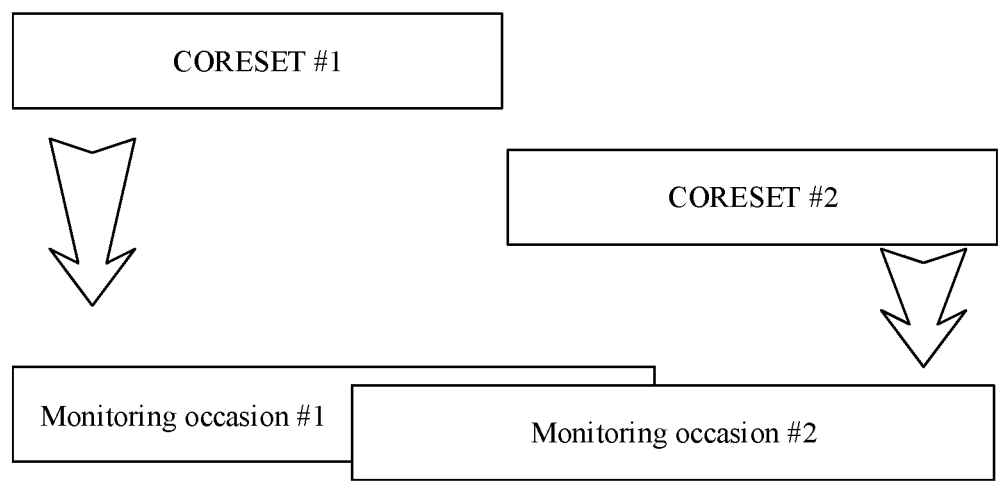
FIG. 5 is a schematic diagram of a method for determining a span according to an embodiment of this application.

As shown in FIG. 5, if the network device 102 indicates configuration information of a CORESET #1 and configuration information of a CORESET #2 to the terminal 101, the terminal 101 may determine a span #1 based on the configuration information of the CORESET #1, and determine a span #2 based on the configuration information of the CORESET #2. As shown in FIG. 5, the span #1 overlaps the span #2. In this case, it may be considered that a time domain spacing Z between the span #1 and the span #2 is less than 0. When the minimum time domain spacing between the spans supported by the terminal 101 may be less than 0, the terminal 101 may blindly detect the PDCCH based on the span #1 and the span #2.

For example, the terminal 101 may report the minimum time domain spacing between the spans supported by the terminal 101 to the network device 102, and the network device 102 configures the configuration information of the plurality of CORESETs based on the minimum time domain spacing. For example, when the minimum time domain spacing between the spans supported by the terminal is less than 0, the network device 102 may configure the CORESET #1 and the CORESET #2 shown in FIG. 5. When the minimum time domain spacing between the spans supported by the terminal is not less than 0, the network device 102 does not configure the CORESET #1 and the CORESET #2 shown in FIG. 5.

In this example, the terminal 101 blindly detects the PDCCH in the span corresponding to each CORESET, and the terminal 101 detects no more than one PDCCH in each span. In this example, UE may report the minimum time domain spacing between the spans, to less frequently detect the DCI.

In another example of S202, the terminal 101 may determine one span based on the configuration information of the plurality of CORESETs. The span is associated with the plurality of CORESETs.

Figure 6:
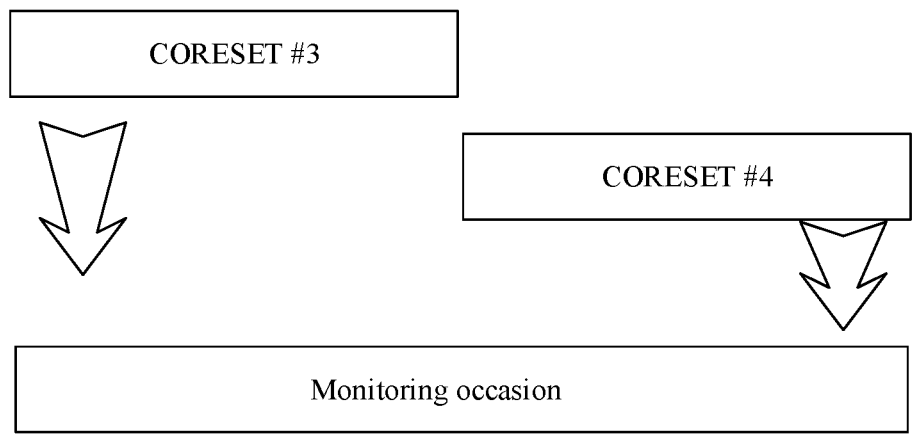
FIG. 6 is a schematic diagram of another method for determining a span according to an embodiment of this application.

In this example, the terminal 101 may determine a length of the span based on a maximum length of each of the plurality of CORESETs. Specifically, FIG. 6 is used as an example. When the network device 102 indicates configuration information of a CORESET #3 and configuration information of a CORESET #4 to the terminal 101, the terminal 101 may determine the length of the span based on the following formula:

$$D_{span} = \max(\text{CORESET \#3}) + \max(\text{CORESET \#4}),$$
where $D_{span}$ represents the length of the span, max(CORESET #3) represents a maximum length of the CORESET #3, and max(CORESET #4) represents a maximum length of the CORESET #4.

In this example, the terminal 101 may further determine, based on a quantity of a plurality of CORESETs, a quantity of PDCCHs detected in the span. For example, the terminal 101 may detect two PDCCHs in the span shown in FIG. 6.

For example, the terminal 101 may report a maximum quantity that is of PDCCHs received in a span and that is supported by the terminal 101 to the network device 102, and the network device 102 configures the configuration information of the plurality of DORESETs based on the quantity. Specifically, when the terminal 101 does not support receiving of a plurality of PDCCHs in one span, the terminal 101 may report information indicating that a quantity of PDCCHs received by the terminal 101 in each span is 1 to the network device, and the terminal 101 does not determine one span based on the configuration information of the plurality of CORESETs configured by the network device 102.

In this example, the terminal 101 may receive the PDCCH in the span corresponding to the plurality of CORESETs, and the terminal 101 may detect a plurality of PDCCHs in each span. A quantity of PDCCHs detected by the terminal 101 in each span does not exceed a maximum quantity that is of PDCCHs received in a span and that is supported by the terminal 101. When the plurality of spans overlap, the terminal 101 may not perform blind detection in an overlapping span.

In implementing S203, the terminal 101 may determine a time frequency location of a PDCCH candidate location in each span based on the configuration information of the plurality of CORESETs. Specifically, the terminal 101 may determine the time frequency location of the PDCCH candidate location in each span based on information about the PDCCH candidate location corresponding to each CORESET, and may further blindly detect the PDCCH at the time frequency location of the PDCCH candidate location.

Based on an inventive concept the same as that of the foregoing method embodiment, an embodiment of this application further provides a communications apparatus. The communications apparatus may implement the function, step, or operation of the network device or the terminal in the foregoing method embodiment. For example, a functional module corresponding to the function, step, or operation in the foregoing method may be disposed in the communications apparatus to support the communications apparatus in performing the method. The function may be implemented by hardware, or may be implemented by software or hardware executing corresponding software. The hardware or the software includes one or more modules corresponding to the function. For example, the communications apparatus may be a chip or a communications chip that includes a communications module, or may be implemented by a chip or a communications chip that includes a communications module.

Figure 7:
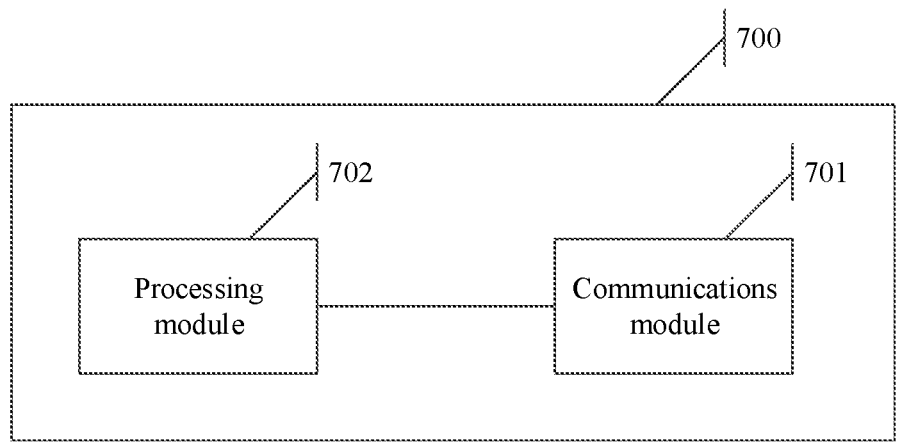
FIG. 7 is a schematic diagram of a structure of a communications apparatus according to an embodiment of this application.

In a possible implementation, a communications apparatus 700 shown in FIG. 7 may be used as the network device in the foregoing method embodiment, and perform the steps performed by the network device (for example, the network device 102) in the foregoing method embodiment. As shown in FIG. 7, the communications apparatus 700 may include a communications module 701 and a processing module 702. The communications module 701 and the processing module 702 are coupled to each other. The communications module 701 may be configured to support the communications apparatus 700 in performing communication. The communications module 701 may have a wireless communication function, for example, can perform wireless communication with another communications apparatus through a wireless air interface. The processing module 702 may be configured to support the communications apparatus 700 in performing the processing action in the foregoing method embodiment, including but not limited to: generating information and a message that are sent by the communications module 701, and/or demodulating and decoding a signal received by the communications module 701.

Specifically, the processing module 702 may be configured to determine first configuration information. The first configuration information is used to indicate a configured quantity of PDCCH candidate locations in a time unit corresponding to a first CORESET group, and the first CORESET group is one of a plurality of CORESET groups in a target cell. The communications module 701 may be configured to send the first configuration information to a terminal.

The communications module 701 may further send first information to the terminal. The first information is used to indicate the first CORESET group.

In a possible design, the first information includes a higher layer index whose value is 0. Alternatively, a value of the first information is 0.

If the target cell is one of a plurality of cells in which the terminal works, the processing module 702 may be further configured to: determine a third quantity based on a PDCCH blind detection capability of the terminal and a second quantity, where the second quantity is a specified maximum quantity of PDCCH candidate locations in a time unit corresponding to a CORESET group in a first cell, the third quantity is a specified maximum quantity of PDCCH candidate locations in a time unit corresponding to the first cell, and the first cell includes one or more cells that are in the plurality of cells and whose parameter sets have a same value; and determine second configuration information based on the second quantity and the third quantity, where the second configuration information is used to configure a PDCCH candidate location for the terminal in the time unit corresponding to the first cell.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,mulit-trp} * n1 + N_{cells}^{DL,\mu,single-trp}\right) \middle/ \right.$$

$$\left. \sum_{j=0}^{3} \left(N_{cells}^{DL,j,multi-trp} * n1 + N_{cells}^{DL,j,single-trp}\right) \right\rfloor,$$

where $M_{PDCCH}^{total,slot,\mu}$ represents the third quantity, $N_{cells}^{cap}$ represents the PDCCH blind detection capability, $M_{PSCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{DL,j,multi-trp}$ represents a quantity of cells, in all cells configured by a network device, for which a plurality of CORESET groups are configured, $N_{cells}^{DL,j,single-trp}$ represents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is determined based on a capability of the terminal.

In a possible design, the third quantity meets the following formula:

$$M_{PDCCH}^{total,slot,\mu} = \left[ N_{cells}^{cap} \cdot M_{PDCCH}^{max,slot,\mu} \cdot \left( N_{cells}^{DL,\mu,multi-trp} * n1 + N_{cells}^{DL,\mu,single-trp} \right) \right.$$

$$\left. / \sum_{j=0}^{3} \left( N_{cells}^{DL,j,multi-trp} * n1 + N_{cells}^{DL,j,single-trp} \right) \right],$$

where $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{DL,j,multi-trp}$ represents a quantity of cells, in all cells configured by a network device, for which a plurality of CORESET groups are configured, $N_{cells}^{DL,j,single-trp}$ represents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is equal to a quantity of CORESET groups in each of the cells, in the first cell, for which a plurality of CORESET groups are configured.

In a possible design, a quantity of times the communications module 701 blindly detects a PDCCH in the time unit corresponding to the first cell does not exceed a product of the second quantity and a quantity of CORESET groups in the first cell.

If the target cell is one of the plurality of cells in which the terminal works, the processing module 702 may further determine a fifth quantity based on the PDCCH blind detection capability of the terminal and a fourth quantity, where the fourth quantity is a specified maximum quantity of non-overlapping CCEs in a time unit corresponding to a CORESET group in a second cell, the fifth quantity is a maximum quantity of non-overlapping CCEs in a time unit corresponding to the second cell, and the second cell includes one or more cells that are in the plurality of cells and whose parameter sets have a same value; and determine third configuration information based on the fourth quantity and the fifth quantity, where the third configuration information is used to configure a maximum quantity of non-overlapping CCEs for the terminal in the time unit corresponding to the second cell.

In a possible design, the fifth quantity meets the following formula:

$$C_{PDCCH}^{total,slot,\mu} = \left[ N_{cells}^{cap} \cdot C_{PDCCH}^{max,slot,\mu} \cdot \left( N_{cells}^{DL,\mu,multi-trp} * n1 + N_{cells}^{DL,\mu,single-trp} \right) \right.$$

$$\left. / \sum_{j=0}^{3} \left( N_{cells}^{DL,j,multi-trp} * n1 + N_{cells}^{DL,j,single-trp} \right) \right],$$

where $C_{PDCCH}^{total,slot,\mu}$ represents the fifth quantity, $N_{cells}^{cap}$ represents the PDCCH blind detection capability, $C_{PDCC}^{max,slot,\mu}$ represents the fourth quantity, $N_c^{DL,\mu,multi-trp}$ quantity of cells, in the second cell, for which a plurality of CORESET groups are configured, $N_c^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ and is the total quantity of all cells, and the value of n1 is determined based on the capability of the terminal.

In a possible design, the fifth quantity meets the following formula:

$$C_{PDCCH}^{total,slot,\mu} = \left[ N_{cells}^{cap} \cdot C_{PDCCH}^{max,slot,\mu} \cdot \left( N_{cells}^{DL,\mu,multi-trp} * n1 + N_{cells}^{DL,\mu,single-trp} \right) \right.$$

$$\left. / \sum_{j=0}^{3} \left( N_{cells}^{DL,j,multi-trp} * n1 + N_{cells}^{DL,j,single-trp} \right) \right],$$

where $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_c^{DL,\mu,multi-trp}$ represents a quantity of cells, in the second cell, for which a plurality of CORESET groups are configured, $N_c^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ is the total quantity of all cells, and a value of n1 is equal to a quantity of CORESET groups in each of the cells, in the second cell, for which a plurality of CORESET groups are configured.

In a possible design, a quantity of non-overlapping CCEs detected by the terminal in the time unit corresponding to the second cell does not exceed a product of the fourth quantity and a quantity of CORESET groups in the second cell.

In a possible design, that a value of n1 is determined based on a capability of the terminal includes: The value of n1 is less than or equal to second information, the second information is used to indicate a value of the PDCCH blind detection capability, and the second information is 1 or 2.

In a possible design, the second information is information reported by the terminal for each frequency band or frequency band combination.

The value of the PDCCH blind detection capability of the terminal is a quantity of transmission/reception points corresponding to the plurality of cells, or the value of the PDCCH blind detection capability of the terminal is m, and $1 \leq m \leq 16$.

The communications module 701 may be further configured to: send one or more multi-TRP coordination capabilities of the terminal to the network device, where the one or more multi-TRP coordination capabilities are used to determine the PDCCH blind detection capability of the terminal; and receive a first indication from the network device, where the first indication is used to indicate the PDCCH blind detection capability. The PDCCH blind detection capability is one of the one or more multi-TRP coordination capabilities. Alternatively, each multi-TRP coordination capability is one of one or more parameter candidate values, and the value of the PDCCH blind detection capability is a parameter candidate value that does not exceed a maximum value of the one or more multi-TRP coordination capabilities.

The communications module 701 may be further configured to receive the second information from the terminal. The second information is used to indicate the value of the PDCCH blind detection capability of the terminal.

When a quantity of a plurality of cells is greater than a value of the PDCCH blind detection capability, the processing module 702 may determine the third quantity based on a value of a parameter set of the first cell, the second quantity, the quantity of CORESET groups in the first cell, and a quantity of CORESET groups in the plurality of cells.

When a quantity of a plurality of cells is greater than a value of the PDCCH blind detection capability, the processing module 702 may determine the fifth quantity based on a value of a parameter set of the second cell, the fourth quantity, the quantity of CORESET groups in the second cell, and a quantity of CORESET groups in the plurality of cells.

In another possible implementation, the communications apparatus provided in this embodiment of this application may alternatively include a hardware component. The hardware component is, for example, a processor, a memory, or a transceiver.

Figure 8:
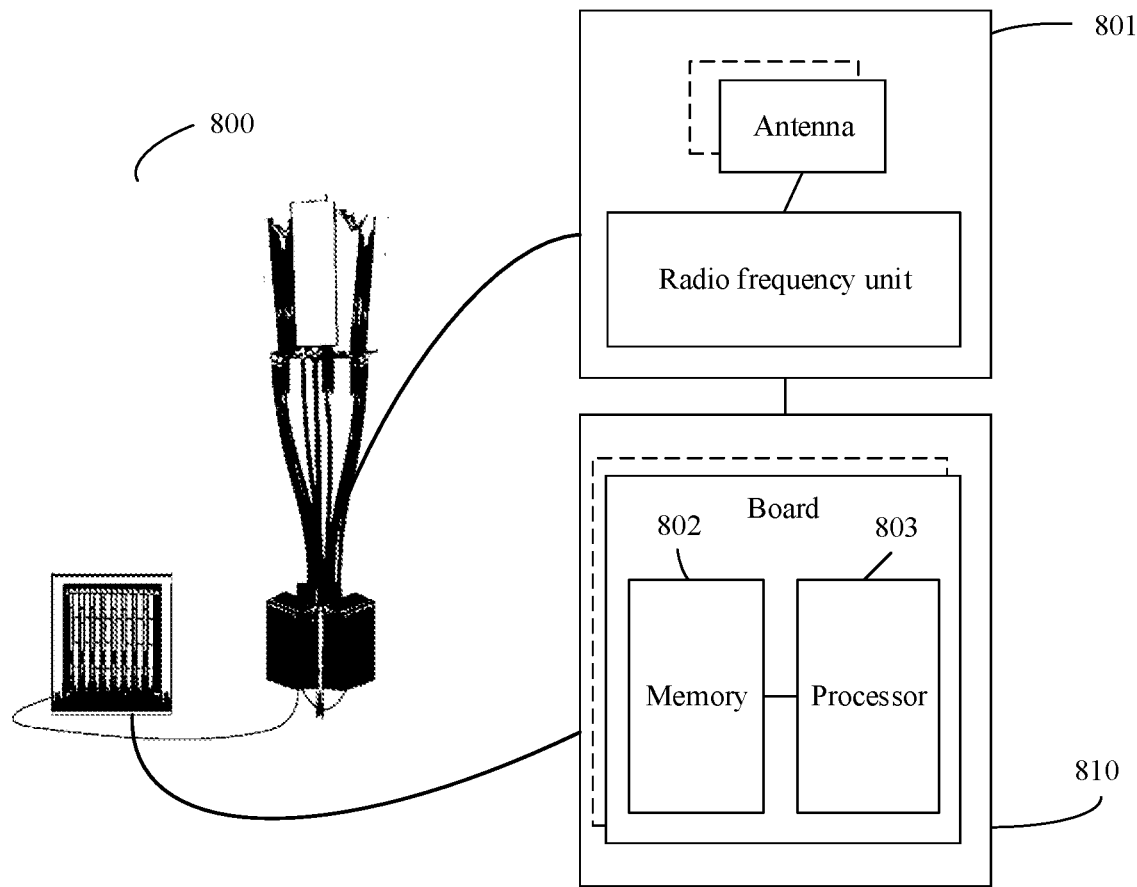
FIG. 8 is a schematic diagram of a structure of another communications apparatus according to an embodiment of this application.

For ease of understanding, a structure of the communications apparatus is described by using a base station as an example in FIG. 8. As shown in FIG. 8, the communications apparatus 800 may include a transceiver 801, a memory 802, and a processor 803. The transceiver 801 may be used by the communications apparatus to perform communication, for example, send or receive the foregoing first information. The memory 802 is coupled to the processor 803, and may be configured to store a program and data that are necessary for the communications apparatus 800 to implement a function. The processor 803 is configured to support the communications apparatus 800 in performing a corresponding function in the foregoing method. The function may be implemented by invoking the program stored in the memory 802.

Specifically, the transceiver 801 may be a wireless transceiver, and may be configured to support the communications apparatus 800 in receiving and sending signaling and/or data through a wireless air interface. The transceiver 801 may also be referred to as a transceiver unit or a communications unit. The transceiver 801 may include a radio frequency unit and one or more antennas. For example, the radio frequency unit such as a remote radio unit (remote radio unit, RRU) may be specifically configured to: transmit a radio frequency signal, and perform conversion between the radio frequency signal and a baseband signal. The one or more antennas may be specifically configured to radiate and receive the radio frequency signal. Optionally, the transceiver 801 may include only the radio frequency unit. In this case, the communications apparatus 800 may include the transceiver 801, the memory 802, the processor 803, and an antenna.

The memory 802 and the processor 803 may be integrated, or may be independent of each other. As shown in FIG. 8, the memory 802 and the processor 803 may be integrated into a control unit 810 of the communications apparatus 800. For example, the control unit 810 may include a baseband unit of an LTE base station, and the baseband unit may also be referred to as a digital unit (digital unit, DU). Alternatively, the control unit 810 may include a distributed unit (distribute unit, DU) and/or a centralized unit (centralized unit, CU) in a base station in 5G and a future radio access technology. The control unit 810 may include one or more boards. For example, a plurality of boards may jointly support a radio access network (for example, an LTE network) of a single access standard, or a plurality of boards may respectively support radio access networks of different access standards (for example, an LTE network, a 5G network, or another network). The memory 802 and the processor 803 may serve one or more boards. That is, the memory 802 and the processor 803 may be disposed on each board. Alternatively, a plurality of boards may share a same memory 802 and a same processor 803. In addition, a necessary circuit may be disposed on each board. For example, the circuit may be configured to couple the memory 802 to the processor 803. The transceiver 801, the processor 803, and the memory 802 may be connected by using a bus (bus) structure and/or another connection medium.

Based on the structure shown in FIG. 8, when the communications apparatus 800 needs to send data, the processor 803 may perform baseband processing on the to-be-sent data, and then output a baseband signal to the radio frequency unit. The radio frequency unit performs radio frequency processing on the baseband signal, and then sends a radio frequency signal in a form of an electromagnetic wave through the antenna. When data is to be sent to the communications apparatus 800, the radio frequency unit receives a radio frequency signal through the antenna, converts the radio frequency signal into a baseband signal, and outputs the baseband signal to the processor 803. The processor 803 converts the baseband signal into data, and processes the data.

For example, the processor 803 may be configured to perform the steps performed by the processing module 702, and/or the transceiver 801 may be configured to perform the steps performed by the communications module 701.

Figure 9:
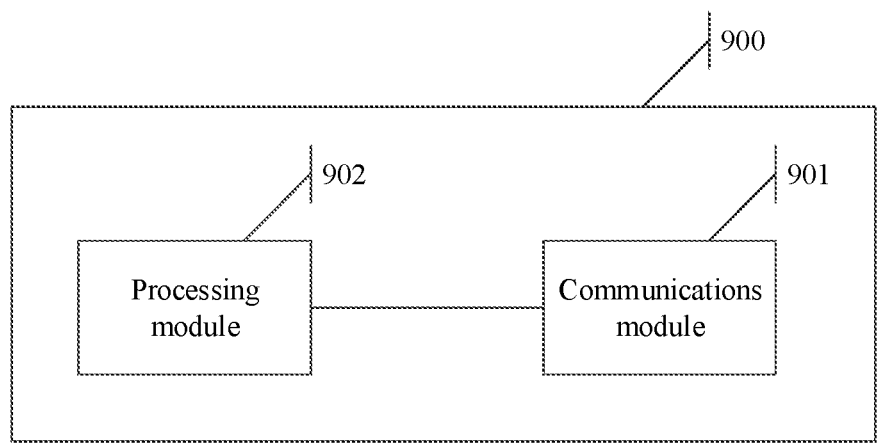
FIG. 9 is a schematic diagram of a structure of another communications apparatus according to an embodiment of this application.

In a possible implementation, a communications apparatus 900 shown in FIG. 9 may be used as the terminal in the foregoing method embodiment, and perform the steps performed by the terminal (for example, the terminal 101) in the foregoing method embodiment. As shown in FIG. 9, the communications apparatus 900 may include a communications module 901 and a processing module 902. The communications module 901 and the processing module 902 are coupled to each other. The communications module 901 may be configured to support the communications apparatus 900 in performing communication. The communications module 901 may have a wireless communication function, for example, can perform wireless communication with another communications apparatus through a wireless air interface. The processing module 902 may be configured to support the communications apparatus 900 in performing the processing action in the foregoing method embodiment, including but not limited to: generating information and a message that are sent by the communications module 901, and/or demodulating and decoding a signal received by the communications module 901.

For example, the communications module 901 may be configured to receive first configuration information from a network device. The first configuration information is used to indicate a configured quantity of PDCCH candidate locations in a time unit corresponding to a first CORESET group. When the configured quantity is greater than a first quantity, the communications module 901 may be further configured to detect a PDCCH at PDCCH candidate locations whose quantity is less than or equal to the first quantity. Alternatively, when the configured quantity is less than or equal to a first quantity, the communications module 901 may be further configured to detect a PDCCH at PDCCH candidate locations whose quantity is less than or equal to the configured quantity. The first quantity is a preset maximum quantity of PDCCH candidate locations in a time unit corresponding to a CORESET group in a target cell, and the first CORESET group is one of a plurality of CORESET groups in the target cell.

The communications module 901 may be further configured to receive first information from the network device. The first information is used to indicate the first CORESET group.

In a possible design, the first information includes a higher layer index whose value is 0. Alternatively, a value of the first information is 0.

If the target cell is one of a plurality of cells in which the terminal works, the processing module 902 may be configured to determine a third quantity based on a PDCCH blind detection capability of the terminal and a second quantity, where the second quantity is a specified maximum quantity of PDCCH candidate locations in a time unit corresponding to a CORESET group in a first cell, the third quantity is a specified maximum quantity of PDCCH candidate locations in a time unit corresponding to the first cell, and the first cell includes one or more cells that are in the plurality of cells and whose parameter sets have a same value; and a quantity of times the communications module 901 blindly detects the PDCCH in a time unit corresponding to each CORESET group in the first cell does not exceed the second quantity and the third quantity.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

where $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cell}^{DL,j,single-trp}$ represents a quantity of cells, in all the cells, for which one CORESET group is configured, a sum of $N_{cell}^{DL,j,multi-trp}$ and $N_{cell}^{DL,j,single-trp}$ is a total quantity of all cells, and a value of n1 is determined based on a capability of the terminal.

In a possible design, the third quantity meets the following formula:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

where $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_c^{DL,\mu,multi-trp}$ represents a quantity of cells, in the first cell, for which a plurality of CORESET groups are configured, $N_c^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ presents a quantity of cells, in all the cells, for which one CORESET group is configured, a sum of $N_c^{DL,j,multi-trp}$ and $N_c^{DL,j,single-trp}$ is a total quantity of all cells, and a value of n1 is equal to a quantity of CORESET groups in each of the cells, in the first cell, for which a plurality of CORESET groups are configured.

In a possible design, a quantity of PDCCH candidate locations configured by the network device in a time unit corresponding to each CORESET group in the first cell does not exceed the second quantity and the third quantity.

If the target cell is one of the plurality of cells in which the terminal works, the processing module 902 may be configured to determine a fifth quantity based on the PDCCH blind detection capability of the terminal and a fourth quantity, where the fourth quantity is a specified maximum quantity of non-overlapping CCEs in a time unit corresponding to a CORESET group in a second cell, the fifth quantity is a maximum quantity of non-overlapping CCEs in a time unit corresponding to the second cell, and the second cell includes one or more cells that are in the plurality of cells and whose parameter sets have a same value; and a quantity of non-overlapping CCEs detected by the communications module 901 in a time unit corresponding to each CORESET group in the second cell does not exceed the fourth quantity and the fifth quantity.

In a possible design, the fifth quantity meets the following formula:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

where $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_c^{DL,\mu,multi-trp}$ represents a quantity of cells, in the second cell, for which a plurality of CORESET groups are configured, $N_c^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ is the total quantity of all cells, and the value of n1 is determined based on the capability of the terminal.

In a possible design, the fifth quantity meets the following formula:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

where $C_{PDCCH}^{total,slot,\mu}$ represents the fifth quantity, $N_{cell}^{cap}$ represents the PDCCH blind detection capability, $X_{PDCC}^{max,slot,\mu}$ represents the fourth quantity, $N_c^{DL,\mu,multi-trp}$ represents a quantity of cells, in the second cell, for which a plurality of CORESET groups are configured, $N_c^{DL,\mu,single-trp}$ represents the quantity of cells, in the first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ and is the total quantity of all cells, and a value of n1 is equal to a quantity of CORESET groups in each of the cells, in the second cell, for which a plurality of CORESET groups are configured.

In a possible design, a maximum quantity of non-overlapping CCEs configured by the network device in the time unit corresponding to the second cell does not exceed a product of the fourth quantity and a quantity of CORESET groups in the second cell.

In a possible design, that a value of n1 is determined based on a capability of the terminal includes: The value of n1 is less than or equal to second information, the second information is used to indicate a value of the PDCCH blind detection capability, and the second information is 1 or 2.

In a possible design, the second information is information reported by the terminal for each frequency band or frequency band combination.

The value of the PDCCH blind detection capability of the terminal is a quantity of transmission/reception points corresponding to the plurality of cells, or the value of the PDCCH blind detection capability of the terminal is m, and 1≤m≤16.

The communications module 901 may be further configured to receive one or more multi-TRP coordination capabilities of the terminal from the terminal. The processing module 902 is further configured to determine the PDCCH blind detection capability of the terminal based on the one or more multi-TRP coordination capabilities. The PDCCH blind detection capability is one of the one or more multi-TRP coordination capabilities. Alternatively, each multi-TRP coordination capability is one of one or more parameter candidate values, and the value of the PDCCH blind detection capability is a parameter candidate value that does not exceed a maximum value of the one or more multi-TRP coordination capabilities. The communications module 901 may be further configured to send a first indication to the terminal. The first indication is used to indicate the PDCCH blind detection capability.

The communications module 901 may be further configured to send the second information to the network device. The second information is used to indicate the value of the PDCCH blind detection capability.

When a quantity of a plurality of cells is greater than a value of the PDCCH blind detection capability, the processing module 90 may determine the third quantity based on a value of a parameter set of the first cell, the second quantity, the quantity of CORESET groups in the first cell, and a quantity of CORESET groups in the plurality of cells.

When a quantity of a plurality of cells is greater than a value of the PDCCH blind detection capability, the processing module 902 may determine the fifth quantity based on a value of a parameter set of the second cell, the fourth quantity, the quantity of CORESET groups in the second cell, and a quantity of CORESET groups in the plurality of cells.

Figure 10:
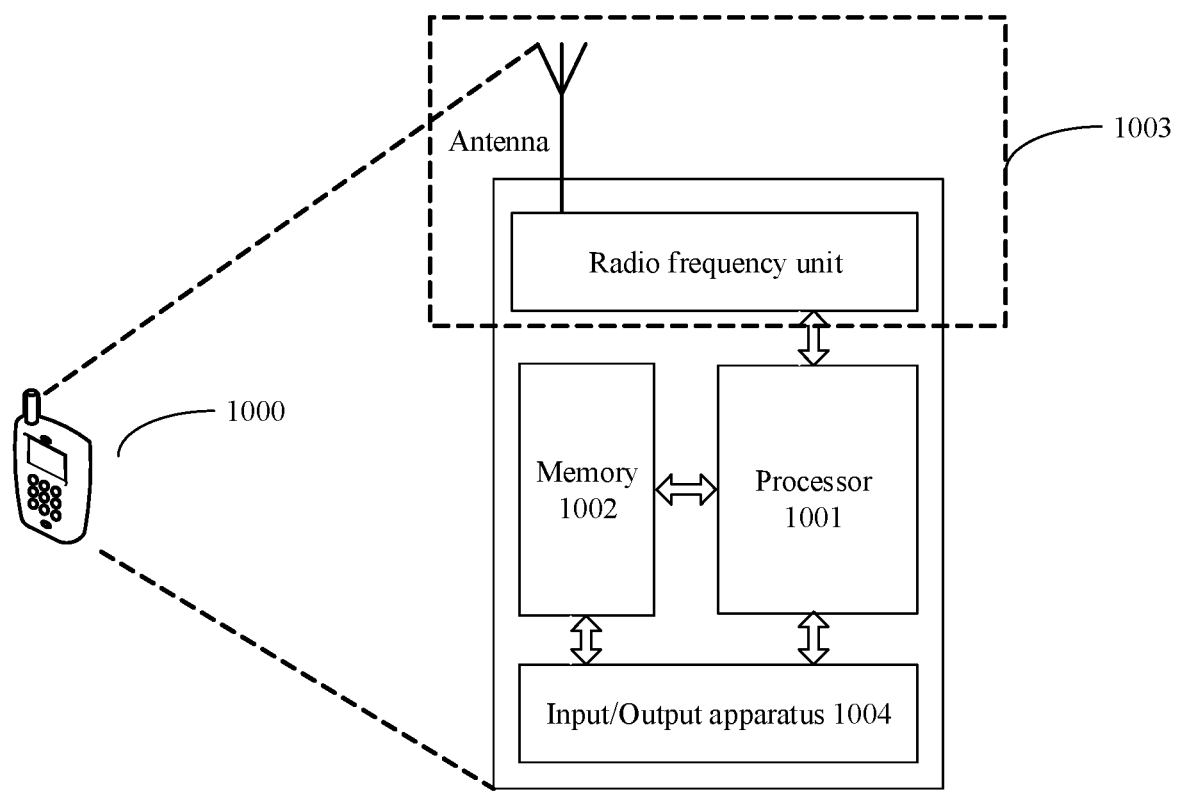
FIG. 10 is a schematic diagram of a structure of another communications apparatus according to an embodiment of this application.

In another possible implementation, when the communications apparatus is a terminal 101, a structure of the communications apparatus may be shown in FIG. 10. For ease of understanding and ease of illustration, in FIG. 10, the structure of the communications apparatus is described by using an example in which the terminal is a mobile phone. As shown in FIG. 10, the communications apparatus 1000 may include a processor 1001, a memory 1002, and a transceiver 1003.

The processor 1001 may be configured to: process a communications protocol and communication data, control the terminal, execute a software program, process data of the software program, and so on. The memory 1002 may be configured to store a program and data, and the processor 1001 may perform, based on the program, the method performed by the terminal 101 in the embodiments of this application.

The transceiver 1003 may include a radio frequency unit and an antenna. For example, the radio frequency unit may be configured to: perform conversion between a baseband signal and a radio frequency signal, and process the radio frequency signal. The antenna may be configured to send and receive a radio frequency signal in a form of an electromagnetic wave. Optionally, only the radio frequency unit may be considered as the transceiver 1003. In this case, the communications apparatus 1000 may include the processor 1001, the memory 1002, the transceiver 1003, and an antenna.

Optionally, the communications apparatus 1000 may further include an input/output apparatus 1004, for example, a component, for example, a touchscreen, a display screen, or a keyboard, that may be configured to: receive data input by a user, and output data to the user. It should be noted that some types of communications apparatuses may have no input/output apparatus.

Based on the structure shown in FIG. 10, when the communications apparatus 1000 needs to send data, the processor 1001 may perform baseband processing on the to-be-sent data, and then output a baseband signal to the radio frequency unit. The radio frequency unit performs radio frequency processing on the baseband signal, and then sends a radio frequency signal in a form of an electromagnetic wave through the antenna. When data is to be sent to the communications apparatus 1000, the radio frequency unit receives a radio frequency signal through the antenna, converts the radio frequency signal into a baseband signal, and outputs the baseband signal to the processor 1001. The processor 1001 converts the baseband signal into data, and processes the data.

For example, the processor 1003 may be configured to perform the steps performed by the processing module 902, and/or the transceiver 1001 may be configured to perform the steps performed by the communications module 901.

In addition, based on an actual use requirement, the communications apparatus provided in this embodiment of this application may include a processor, and the processor invokes an external transceiver and/or a memory to implement the foregoing function, step, or operation. The communications apparatus may further include the memory, and the processor invokes and executes a program stored in the memory to implement the foregoing function, step, or operation. Alternatively, the communications apparatus may include a processor and a transceiver, and the processor invokes and executes a program stored in an external memory to implement the foregoing function, step, or operation. Alternatively, the communications apparatus may include a processor, a memory, and a transceiver.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of protection defined by the claims of this application and equivalent technologies thereof

What is claimed is:

1. A communication method, comprising:
   receiving, by a terminal device, first configuration information from a network device, wherein the first configuration information indicates a configured quantity of physical downlink control channel (PDCCH) candidate locations in a time unit corresponding to a first control resource set (CORESET) group of a plurality of CORESET groups in a target cell; and
   determining, by the terminal device, based on the configured quantity and a first quantity, a quantity of PDCCH candidate locations for PDCCH detection in the time unit corresponding to the first CORESET group, wherein
   the quantity of PDCCH candidate locations for PDCCH detection is less than or equal to the first quantity when the configured quantity is greater than the first quantity, or
   the quantity of PDCCH candidate locations for PDCCH detection is less than or equal to the configured quantity when the configured quantity is less than or equal to the first quantity, and wherein
   the first quantity is a preset quantity of PDCCH candidate locations in the time unit; and
   determining, by the terminal device, a third quantity based on a second quantity and a PDCCH blind detection capability of the terminal device or a fifth quantity based on a fourth quantity and the PDCCH blind detection capability, wherein:
   the second quantity is a predetermined maximum quantity of PDCCH candidate locations in a time unit corresponding to a CORESET group in a first cell,
   the third quantity is a predetermined maximum quantity of PDCCH candidate locations in a time unit corresponding to the first cell,
   the fourth quantity is a predetermined maximum quantity of non-overlapping CCEs in a time unit corresponding to a CORESET group in a second cell,
   the fifth quantity is a maximum quantity of non-overlapping CCEs in a time unit corresponding to the second cell, and
   the first cell and the second cell comprises one or more cells in a plurality of cells with parameter sets having a same value.

2. The method according to claim 1, wherein the method further comprises:
   receiving, by the terminal device from the network device, first indication information indicating the first CORESET group.

3. The method according to claim 2, wherein a value of the first indication information is 0.

4. The method according to claim 1, wherein the target cell is one of the plurality of cells, and wherein
   a quantity of times the terminal device blindly detects the PDCCH in a time unit corresponding to each CORESET group in the first cell does not exceed the second quantity and the third quantity.

5. The method according to claim 4, wherein the third quantity satisfies the following equation:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

wherein $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_{cells}^{DL,\mu,multi-trp}$ represents a quantity of cells, in the first cell, for which a plurality of CORESET groups are configured, $N_{cells}^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ represents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is determined based on a capability of the terminal device.

6. The method according to claim 4, wherein the third quantity satisfies the following equation:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

wherein $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_{cells}^{DL,\mu,multi-trp}$ represents a quantity of cells, in the first cell, for which a plurality of CORESET groups are configured, a quantity of a plurality of CORESET groups is n1, $N_{cells}^{DL,\mu,single-trp}$ represents a quantity of cells, in the first cell, for which one CORESET group is configured, $N_{cells}^{DL,j,multi-trp}$ cells represents a quantity of cells, in all cells configured by the network device, for which a plurality of CORESET groups are configured, $N_{cells}^{DL,j,single-trp}$ cells represents a quantity of cells, in all the cells, for which one CORESET group is configured, and a sum of $N_{cells}^{DL,j,multi-trp}$ and $N_{cells}^{DL,j,single-trp}$ is a total quantity of all cells.

7. The method according to claim 4, wherein a quantity of times the terminal device blindly detects the PDCCH in the time unit corresponding to the first cell does not exceed a product of the second quantity and a quantity of CORESET groups in the first cell.

8. The method according to claim 1, wherein the target cell is one of the plurality of cells, and wherein a quantity of non-overlapping CCEs detected by the terminal device in a time unit corresponding to each CORESET group in the second cell does not exceed the fourth quantity and the fifth quantity.

9. The method according to claim 8, wherein the fifth quantity satisfies the following equation:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

wherein $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{cells}^{DL,\mu,multi-trp}$ represents a quantity of cells, in the second cell, for which a plurality of CORESET groups are configured, $N_{cells}^{DL,\mu,single-trp}$ represents the quantity of cells, in the second cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ and $N_{cells}^{DL,j,single-trp}$ is a total quantity of all cells, and a value of n1 is determined based on a capability of the terminal device.

10. The method according to claim 8, wherein the fifth quantity satisfies the following equation:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \middle/ \sum_{j=0}^{3}\left(N_{cells}^{DL,j,multi-trp} * n1 + N_{cells}^{DL,j,single-trp}\right)\right\rfloor,$$

wherein $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{cells}^{DL,\mu,multi-trp}$ represents a quantity of cells, in the second cell, for which a plurality of CORESET groups are configured, a quantity of a plurality of CORESET groups is n1, $N_{cells}^{DL,\mu,single-trp}$ represents the quantity of cells, in a first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, and the sum of $N_{cells}^{DL,j,multi-trp}$ and $N_{cells}^{DL,j,single-trp}$ is a total quantity of all cells.

11. The method according to claim 8, wherein a quantity of non-overlapping CCEs detected by the terminal device in the time unit corresponding to the second cell does not exceed a product of the fourth quantity and a quantity of CORESET groups in the second cell.

12. The method according to claim 5, wherein the value of n1 is less than or equal to a value of second information indicating a value of the PDCCH blind detection capability, and the value of second information is 1 or 2.

13. The method according to claim 12, wherein the second information is reported by the terminal device for each frequency band or frequency band combination.

14. The method according to claim 4, wherein
a value of the PDCCH blind detection capability of the terminal device is a quantity of transmission/reception points corresponding to the plurality of cells; or
the value of the PDCCH blind detection capability of the terminal device is m, and $1 \leq m \leq 16$.

15. The method according to claim 4, wherein the method further comprises:
sending, by the terminal device, one or more multi-transmission/reception point (TRP) coordination capabilities of the terminal device to the network device, wherein the one or more the PDCCH blind detection capability of the terminal device is determined based on the one or more multi-TRP coordination capabilities; and
receiving, by the terminal device, a first indication from the network device, wherein the first indication indicates the PDCCH blind detection capability, wherein the PDCCH blind detection capability is one of the one or more multi-TRP coordination capabilities; or
each multi-TRP coordination capability is one of one or more parameter candidate values, and a value of the PDCCH blind detection capability is a parameter candidate value that does not exceed a maximum value of the one or more multi-TRP coordination capabilities.

16. The method according to claim 4, wherein the method further comprises:
sending, by the terminal device, second information to the network device, wherein the second information indicates a value of the PDCCH blind detection capability.

17. The method according to claim 4, wherein a quantity of a plurality of cells is greater than a value of the PDCCH blind detection capability, the determining, by the terminal device, a third quantity based on a PDCCH blind detection capability of the terminal device and a second quantity comprises:
determining, by the terminal device, the third quantity based on a value of a parameter set of the first cell, the second quantity, a quantity of CORESET groups in the first cell, and a quantity of CORESET groups in the plurality of cells.

18. The method according to claim 8, wherein a quantity of a plurality of cells is greater than a value of the PDCCH blind detection capability, the determining, by the terminal device, a fifth quantity based on the PDCCH blind detection capability of the terminal device and a fourth quantity comprises:
determining, by the terminal device, the fifth quantity based on a value of a parameter set of the second cell, the fourth quantity, a quantity of CORESET groups in the second cell, and a quantity of CORESET groups in the plurality of cells.

19. A communications apparatus, comprising: at least one processor, and one or more memories coupled to the at least one processor and storing programming instructions for execution by the at least one processor to perform operations comprising:
receiving first configuration information from a network device, wherein the first configuration information indicates a configured quantity of physical downlink control channel (PDCCH) candidate locations in a time unit corresponding to a first control resource set (CORESET) group of a plurality of CORESET groups in a target cell; and
determining based on the configured quantity and a first quantity, a quantity of PDCCH candidate locations for PDCCH detection in the time unit corresponding to the first CORESET group, wherein
the quantity of PDCCH candidate locations for PDCCH detection is less than or equal to the first quantity when the configured quantity is greater than the first quantity, or
the quantity of PDCCH candidate locations for PDCCH detection is less than or equal to the configured quantity when the configured quantity is less than or equal to the first quantity, and wherein
the first quantity is a preset quantity of PDCCH candidate locations in a time unit corresponding to a CORESET group in the target cell; and
determining a third quantity based on a second quantity and a PDCCH blind detection capability of the terminal device or a fifth quantity based on a fourth quantity and the PDCCH blind detection capability, wherein:
the second quantity is a predetermined maximum quantity of PDCCH candidate locations in a time unit corresponding to a CORESET group in a first cell,
the third quantity is a predetermined maximum quantity of PDCCH candidate locations in a time unit corresponding to the first cell,
the fourth quantity is a predetermined maximum quantity of non-overlapping CCEs in a time unit corresponding to a CORESET group in a second cell,
the fifth quantity is a maximum quantity of non-overlapping CCEs in a time unit corresponding to the second cell, and
the first cell and the second cell comprises one or more cells in a plurality of cells with parameter sets having a same value.

20. The communications apparatus according to claim 19, wherein the operations comprises:
receiving first indication information indicating the first CORESET group.

21. The communications apparatus according to claim 20, wherein a value of the first indication information is 0.

22. The communications apparatus according to claim 19, wherein the target cell is one of the plurality of cells, and wherein
a quantity of times the communications apparatus blindly detects the PDCCH in a time unit corresponding to each CORESET group in the first cell does not exceed the second quantity and the third quantity.

23. The communications apparatus according to claim 22, wherein
the third quantity satisfies the following equation:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \right.$$

$$\left. / \sum_{j=0}^{3}\left(N_{cells}^{DL,j,multi-trp} * n1 + N_{cells}^{DL,j,single-trp}\right)\right\rfloor,$$

wherein
$M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_{cells}^{DL,\mu,multi-trp}$ represents a quantity of cells, in the first cell, for which a plurality of CORESET groups are configured, $N_{cells}^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ represents a quantity of cells, in all the cells, for which one CORESET group is configured, a sum of $N_{cells}^{DL,j,multi-trp}$ and $N_{cells}^{DL,j,single-trp}$ is a total quantity of all cells, and a value of n1 is determined based on a capability of the terminal device.

24. The communications apparatus according to claim 22, wherein the third quantity satisfies the following equation:

$$M_{PDCCH}^{total,slot,\mu} = \left\lfloor N_{cells}^{cap} \cdot M_{PDCCH}^{max,slot,\mu} \cdot \left(N_{cells}^{DL,\mu,multi-trp} * n1 + N_{cells}^{DL,\mu,single-trp}\right) \right. $$

$$\left. / \sum_{j=0}^{3}\left(N_{cells}^{DL,j,multi-trp} * n1 + N_{cells}^{DL,j,single-trp}\right) \right\rfloor,$$

wherein $M_{PDCCH}^{total,slot,\mu}$ represents the third quantity, $N_{cells}^{cap}$ represents the PDCCH blind detection capability, $M_{PDCCH}^{max,slot,\mu}$ represents the second quantity, $N_{cells}^{DL,\mu,multi-trp}$ represents a quantity of cells, in the first cell, for which a plurality of CORESET groups are configured, a quantity of a plurality of CORESET groups is n1, $N_{cells}^{DL,\mu,single-trp}$ represents a quantity of cells, in the first cell, for which one CORESET group is configured, $N_{cells}^{DL,j,multi-trp}$ represents a quantity of cells, in all cells configured by the network device, for which a plurality of CORESET groups are configured, $N_{cells}^{DL,j,single-trp}$ represents a quantity of cells, in all the cells, for which one CORESET group is configured, and a sum of $N_{cells}^{DL,j,multi-trp}$ and $N_{cells}^{DL,j,single-trp}$ is a total quantity of all cells.

25. The communications apparatus according to claim 22, wherein
a quantity of times the terminal device blindly detects the PDCCH in the time unit corresponding to the first cell does not exceed a product of the second quantity and a quantity of CORESET groups in the first cell.

26. The communications apparatus according to claim 19, wherein the target cell is one of the plurality of cells, and wherein
a quantity of non-overlapping CCEs detected by the communications apparatus in a time unit corresponding to each CORESET group in the second cell does not exceed the fourth quantity and the fifth quantity.

27. The communications apparatus according to claim 26, wherein
the fifth quantity satisfies the following equation:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \right.$$

$$\left. / \sum_{j=0}^{3}\left(N_{cells}^{DL,j,multi-trp} * n1 + N_{cells}^{DL,j,single-trp}\right) \right\rfloor,$$

wherein $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{cells}^{DL,\mu,multi-trp}$ represents a quantity of cells, in the second cell, for which a plurality of CORESET groups are configured, $N_{cells}^{DL,\mu,single-trp}$ represents the quantity of cells, in a first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, the sum of $N_{cells}^{DL,j,multi-trp}$ $N_{DL,j,single-trp}$ is a total quantity of all cells, and a value of n1 is determined based on a capability of the communications apparatus.

28. The communications apparatus according to claim 26, wherein
the fifth quantity satisfies the following equation:

$$C_{PDCCH}^{total,slot,\mu} = \left\lfloor N_{cells}^{cap} \cdot C_{PDCCH}^{max,slot,\mu} \cdot \left(N_{cells}^{DL,\mu,multi-trp} * n1 + N_{cells}^{DL,\mu,single-trp}\right) \right.$$

$$\left. / \sum_{j=0}^{3}\left(N_{cells}^{DL,j,multi-trp} * n1 + N_{cells}^{DL,j,single-trp}\right) \right\rfloor,$$

wherein $C_{PDCCH}^{total,slot,\mu}$ represents the fifth quantity, $N_{cells}^{cap}$ represents the PDCCH blind detection capability, $C_{PDCCH}^{max,slot,\mu}$ represents the fourth quantity, $N_{cells}^{DL,\mu,multi-trp}$ represents a quantity of cells, in the second cell, for which a plurality of CORESET groups are configured, a quantity of a plurality of CORESET groups is n1, $N_{cells}^{DL,\mu,single-trp}$ represents the quantity of cells, in a first cell, for which one CORESET group is configured, $N_{cells}^{DL,j,multi-trp}$ represents the quantity of cells, in all the cells configured by the network device, for which a plurality of CORESET groups are configured, $N_{cells}^{DL,j,single-trp}$ represents the quantity of cells, in all the cells, for which one CORESET group is configured, and the sum of $N_{cells}^{DL,j,multi-trp}$ cells and $N_{cells}^{DL,j,single-trp}$ cells is a total quantity of all cells.

29. The communications apparatus according to claim 26, wherein a quantity of non-overlapping CCEs detected by the communications apparatus in the time unit corresponding to the second cell does not exceed a product of the fourth quantity and a quantity of CORESET groups in the second cell.

30. The communications apparatus according to claim 23, wherein
the value of n1 is less than or equal to second information indicating a value of the PDCCH blind detection capability, and the value of the second information is 1 or 2.

31. The communications apparatus according to claim 30, wherein the second information is reported by the terminal device for each frequency band or frequency band combination.

32. The communications apparatus according to claim 22, wherein
a value of the PDCCH blind detection capability of the terminal device is a quantity of transmission/reception points corresponding to the plurality of cells; or
the value of the PDCCH blind detection capability of the terminal device is m, and 1≤m<16.

33. The communications apparatus according to claim 22, wherein the operations comprises:
  sending one or more multi-transmission/reception point (TRP) coordination capabilities of the terminal device to the network device, wherein the one or more PDCCH blind detection capability of the terminal device is determined based on the one or more multi-TRP coordination capabilities; and
  receive a first indication from the network device, wherein the first indication indicates the PDCCH blind detection capability, wherein
  the PDCCH blind detection capability is one of the one or more multi-TRP coordination capabilities; or
  each multi-TRP coordination capability is one of one or more parameter candidate values, and a value of the PDCCH blind detection capability is a parameter candidate value that does not exceed a maximum value of the one or more multi-TRP coordination capabilities.

34. The communications apparatus according to claim 22, wherein the operations comprises:
  sending second information to the network device, wherein the second information indicates a value of the PDCCH blind detection capability.

35. The communications apparatus according to claim 22, wherein a quantity of a plurality of cells is greater than a value of the PDCCH blind detection capability, the operations comprises:
  determining the third quantity based on a value of a parameter set of the first cell, the second quantity, a quantity of CORESET groups in the first cell, and a quantity of CORESET groups in the plurality of cells.

36. The communications apparatus according to claim 26, wherein a quantity of a plurality of cells is greater than a value of the PDCCH blind detection capability, the operations comprises:
  determining the fifth quantity based on a value of a parameter set of the second cell, the fourth quantity, a quantity of CORESET groups in the second cell, and a quantity of CORESET groups in the plurality of cells.

37. A non-transitory computer-readable storage medium, wherein the computer-readable storage medium stores instructions, and when the instructions are invoked and executed on a computer, the computer is enabled to perform operations comprises:
  receiving first configuration information from a network device, wherein the first configuration information indicates a configured quantity of physical downlink control channel (PDCCH) candidate locations in a time unit corresponding to a first control resource set (CORESET) group of a plurality of CORESET groups in a target cell; and
  determining based on the configured quantity and a first quantity, a quantity of PDCCH candidate locations for PDCCH detection in the time unit corresponding to the first CORESET group, wherein
    the quantity of PDCCH candidate locations for PDCCH detection is less than or equal to the first quantity when the configured quantity is greater than the first quantity, or
    the quantity of PDCCH candidate locations for PDCCH detection is less than or equal to the configured quantity when the configured quantity is less than or equal to the first quantity, and wherein
    the first quantity is a preset quantity of PDCCH candidate locations in a time unit corresponding to a CORESET group in the target cell; and
  determining a third quantity based on a second quantity and a PDCCH blind detection capability of the terminal device or a fifth quantity based on a fourth quantity and the PDCCH blind detection capability, wherein:
    the second quantity is a predetermined maximum quantity of PDCCH candidate locations in a time unit corresponding to a CORESET group in a first cell;
    the third quantity is a predetermined maximum quantity of PDCCH candidate locations in a time unit corresponding to the first cell;
    the fourth quantity is a predetermined maximum quantity of non-overlapping CCEs in a time unit corresponding to a CORESET group in a second cell;
    the fifth quantity is a maximum quantity of non-overlapping CCEs in a time unit corresponding to the second cell; and
    the first cell and the second cell comprises one or more cells in a plurality of cells with parameter sets having a same value.

38. The non-transitory computer-readable storage medium according to claim 37, wherein the operations comprises:
  receiving first indication information indicating the first CORESET group.

39. The non-transitory computer-readable storage medium according to claim 38, wherein
  a value of the first indication information is 0.

40. The non-transitory computer-readable storage medium according to claim 37, wherein the target cell is one of the plurality of cells, and
  a quantity of times for blindly detecting the PDCCH in a time unit corresponding to each CORESET group in the first cell does not exceed the second quantity and the third quantity.

* * * * *